(12) United States Patent
Fouladi et al.

(10) Patent No.: US 7,538,772 B1
(45) Date of Patent: May 26, 2009

(54) GRAPHICS PROCESSING SYSTEM WITH ENHANCED MEMORY CONTROLLER

(75) Inventors: Farhad Fouladi, Los Altos Hills, CA (US); Winnie W. Yeung, San Jose, CA (US); Howard Cheng, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 1082 days.

(21) Appl. No.: 09/726,220

(22) Filed: Nov. 28, 2000

Related U.S. Application Data

(60) Provisional application No. 60/226,894, filed on Aug. 23, 2000.

(51) Int. Cl.
   *G06F 13/18*   (2006.01)
   *G09G 5/39*    (2006.01)
   *G06F 13/00*   (2006.01)

(52) U.S. Cl. .................. 345/535; 345/531; 711/100

(58) Field of Classification Search .............. 711/154, 711/158, 167, 137, 113, 106, 100, 163, 151, 711/156, 140, 141, 157, 105, 5; 365/222; 345/519, 542, 422, 531, 570, 535, 530, 536, 345/558, 559; 709/235; 710/240, 100, 315, 710/5, 310, 105, 117, 40
See application file for complete search history.

(56) References Cited

U.S. PATENT DOCUMENTS

| | | | |
|---|---|---|---|
| 4,275,413 A | 6/1981 | Sakamoto et al. | |
| 4,357,624 A | 11/1982 | Greenberg | |
| 4,388,620 A | 6/1983 | Sherman | |
| 4,425,559 A | 1/1984 | Sherman | |
| 4,463,380 A | 7/1984 | Hooks, Jr. | |
| 4,491,836 A | 1/1985 | Collmeyer et al. | |
| 4,570,233 A | 2/1986 | Yan et al. | |

(Continued)

FOREIGN PATENT DOCUMENTS

CA    2070934    12/1993

(Continued)

OTHER PUBLICATIONS

Photograph of Sony PlayStation II System.

(Continued)

*Primary Examiner*—Kee M Tung
*Assistant Examiner*—Joni Hsu
(74) *Attorney, Agent, or Firm*—Nixon & Vanderhye, PC

(57) ABSTRACT

A graphics system including a custom graphics and audio processor produces exciting 2D and 3D graphics and surround sound. The system includes a graphics and audio processor including a 3D graphics pipeline and an audio digital signal processor. A memory controller performs a wide range of memory control related functions including arbitrating between various competing resources seeking access to main memory, handling memory latency and bandwidth requirements of the resources requesting memory access, buffering writes to reduce bus turn around, refreshing main memory, and protecting main memory using programmable registers. The memory controller minimizes memory read/write switching using a "global" write queue which queues write requests from various diverse competing resources. In this fashion, multiple competing resources for memory writes are combined into one resource from which write requests are obtained. Memory coherency issues are addressed both within a single resource that has both read and write capabilities and among different resources by efficiently flushing write buffers associated with a resource.

45 Claims, 16 Drawing Sheets

U.S. PATENT DOCUMENTS

| | | |
|---|---|---|
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,666,494 A * | 9/1997 | Mote, Jr. .................... 711/167 |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |

| | | | | | | |
|---|---|---|---|---|---|---|
| 5,721,947 A | 2/1998 | Priem et al. | | 5,870,102 A | 2/1999 | Tarolli et al. |
| 5,724,561 A | 3/1998 | Tarolli et al. | | 5,870,109 A | 2/1999 | McCormack et al. |
| 5,726,689 A | 3/1998 | Negishi et al. | | 5,870,587 A | 2/1999 | Danforth et al. |
| 5,726,947 A | 3/1998 | Yamazaki et al. | | 5,872,902 A | 2/1999 | Kuchkuda et al. |
| 5,727,192 A | 3/1998 | Baldwin | | 5,874,969 A | 2/1999 | Storm et al. |
| 5,734,386 A | 3/1998 | Cosman | | 5,877,741 A | 3/1999 | Chee et al. |
| 5,739,819 A | 4/1998 | Bar-Nahum | | 5,877,770 A | 3/1999 | Hanaoka |
| 5,740,343 A | 4/1998 | Tarolli et al. | | 5,877,771 A | 3/1999 | Drebin et al. |
| 5,740,383 A | 4/1998 | Nally et al. | | 5,880,736 A | 3/1999 | Peercy et al. |
| 5,740,406 A | 4/1998 | Rosenthal et al. | | 5,880,737 A | 3/1999 | Griffen et al. |
| 5,742,749 A | 4/1998 | Foran et al. | | 5,883,638 A | 3/1999 | Rouet et al. |
| 5,742,788 A | 4/1998 | Priem et al. | | 5,886,701 A | 3/1999 | Chauvin et al. |
| 5,745,118 A | 4/1998 | Alcorn et al. | | 5,886,705 A | 3/1999 | Lentz |
| 5,745,125 A | 4/1998 | Deering et al. | | 5,887,155 A | 3/1999 | Laidig |
| 5,748,199 A | 5/1998 | Palm | | 5,890,190 A | 3/1999 | Rutman |
| 5,748,986 A | 5/1998 | Butterfield et al. | | 5,892,517 A | 4/1999 | Rich |
| 5,751,291 A | 5/1998 | Olsen et al. | | 5,892,974 A | 4/1999 | Koizumi et al. |
| 5,751,292 A | 5/1998 | Emmot | | 5,894,300 A | 4/1999 | Takizawa |
| 5,751,295 A | 5/1998 | Becklund et al. | | 5,900,881 A | 5/1999 | Ikedo |
| 5,751,930 A | 5/1998 | Katsura et al. | | 5,903,283 A | 5/1999 | Selwan et al. |
| 5,754,191 A | 5/1998 | Mills et al. | | 5,909,218 A | 6/1999 | Naka et al. |
| 5,757,382 A | 5/1998 | Lee | | 5,909,225 A | 6/1999 | Schinnerer et al. |
| 5,758,182 A | 5/1998 | Rosenthal et al. | | 5,912,675 A | 6/1999 | Laperriere |
| 5,760,783 A | 6/1998 | Migdal et al. | | 5,912,676 A | 6/1999 | Malladi et al. |
| 5,764,228 A | 6/1998 | Baldwin | | 5,914,721 A | 6/1999 | Lim |
| 5,764,237 A | 6/1998 | Kaneko | | 5,914,725 A | 6/1999 | Macinnis et al. |
| 5,764,243 A | 6/1998 | Baldwin | | 5,914,729 A | 6/1999 | Lippincott |
| 5,767,856 A | 6/1998 | Peterson et al. | | 5,917,496 A | 6/1999 | Fujita et al. |
| 5,767,858 A | 6/1998 | Kawase et al. | | 5,920,326 A | 7/1999 | Rentschler et al. |
| 5,768,626 A | 6/1998 | Munson et al. | | 5,920,876 A | 7/1999 | Ungar et al. |
| 5,768,629 A | 6/1998 | Wise et al. | | 5,923,332 A | 7/1999 | Izawa |
| 5,774,133 A | 6/1998 | Neave et al. | | 5,923,334 A | 7/1999 | Luken |
| 5,777,623 A | 7/1998 | Small | | 5,926,182 A | 7/1999 | Menon et al. |
| 5,777,629 A | 7/1998 | Baldwin | | 5,926,647 A | 7/1999 | Adams et al. |
| 5,781,927 A | 7/1998 | Wu et al. | | 5,933,150 A | 8/1999 | Ngo et al. |
| 5,791,994 A | 8/1998 | Hirano et al. | | 5,933,154 A | 8/1999 | Howard et al. |
| 5,798,770 A | 8/1998 | Baldwin | | 5,933,155 A | 8/1999 | Akeley |
| 5,801,706 A | 9/1998 | Fujita et al. | | 5,933,529 A | 8/1999 | Kim |
| 5,801,711 A | 9/1998 | Koss et al. | | 5,936,641 A | 8/1999 | Jain et al. |
| 5,801,716 A | 9/1998 | Silverbrook | | 5,936,683 A | 8/1999 | Lin |
| 5,801,720 A | 9/1998 | Norrod et al. | | 5,940,086 A | 8/1999 | Rentschler et al. |
| 5,805,175 A | 9/1998 | Priem | | 5,940,089 A | 8/1999 | Dilliplane |
| 5,805,868 A | 9/1998 | Murphy | | 5,940,538 A | 8/1999 | Spiegel et al. |
| 5,808,619 A | 9/1998 | Choi et al. | | 5,943,058 A | 8/1999 | Nagy |
| 5,808,630 A | 9/1998 | Pannell | | 5,943,060 A | 8/1999 | Cosman et al. |
| 5,809,219 A | 9/1998 | Pearce et al. | | 5,945,997 A | 8/1999 | Zhao et al. |
| 5,809,278 A | 9/1998 | Watanabe et al. | | 5,949,421 A | 9/1999 | Ogletree et al. |
| 5,815,165 A | 9/1998 | Blixt | | 5,949,423 A | 9/1999 | Olsen |
| 5,815,166 A | 9/1998 | Baldwin | | 5,949,424 A | 9/1999 | Cabral et al. |
| 5,818,456 A | 10/1998 | Cosman et al. | | 5,949,428 A | 9/1999 | Toelle et al. |
| 5,819,017 A | 10/1998 | Akeley et al. | | 5,949,440 A | 9/1999 | Krech, Jr. et al. |
| 5,821,940 A | 10/1998 | Morgan et al. | | 5,956,042 A | 9/1999 | Tucker et al. |
| 5,821,949 A | 10/1998 | Deering | | 5,956,043 A | 9/1999 | Jensen |
| 5,822,516 A | 10/1998 | Krech, Jr. | | 5,958,020 A | 9/1999 | Evoy et al. |
| 5,828,382 A | 10/1998 | Wilde | | 5,959,640 A | 9/1999 | Rudin et al. |
| 5,828,383 A | 10/1998 | May et al. | | 5,963,220 A | 10/1999 | Lee et al. |
| 5,828,907 A | 10/1998 | Wise et al. | | 5,966,134 A | 10/1999 | Arias |
| 5,831,624 A | 11/1998 | Tarolli et al. | | 5,969,726 A | 10/1999 | Rentschler et al. |
| 5,831,625 A | 11/1998 | Rich et al. | | 5,977,979 A | 11/1999 | Clough et al. |
| 5,831,640 A | 11/1998 | Wang et al. | | 5,977,984 A | 11/1999 | Omori |
| 5,835,096 A | 11/1998 | Baldwin | | 5,982,376 A | 11/1999 | Abe et al. |
| 5,835,792 A | 11/1998 | Wise et al. | | 5,982,390 A | 11/1999 | Stoneking et al. |
| 5,838,334 A | 11/1998 | Dye | | 5,986,659 A | 11/1999 | Gallery et al. |
| 5,844,576 A | 12/1998 | Wilde et al. | | 5,986,663 A | 11/1999 | Wilde |
| 5,850,229 A | 12/1998 | Edelsbrunner et al. | | 5,986,677 A | 11/1999 | Jones et al. |
| 5,852,451 A | 12/1998 | Cox et al. | | 5,987,567 A | 11/1999 | Rivard et al. |
| 5,856,829 A | 1/1999 | Gray, III et al. | | 5,990,903 A | 11/1999 | Donovan |
| 5,859,645 A | 1/1999 | Latham | | 5,995,120 A | 11/1999 | Dye |
| 5,861,888 A | 1/1999 | Dempsey | | 5,995,121 A | 11/1999 | Alcokrn et al. |
| 5,861,893 A | 1/1999 | Strugess | | 5,999,189 A | 12/1999 | Kajiya et al. |
| 5,867,166 A | 2/1999 | Myhrvold et al. | | 5,999,196 A | 12/1999 | Storm et al. |
| 5,870,097 A | 2/1999 | Snyder et al. | | 5,999,198 A | 12/1999 | Horan et al. |
| 5,870,098 A | 2/1999 | Gardiner | | 6,002,407 A | 12/1999 | Fadden |

| | | |
|---|---|---|
| 6,002,409 A | 12/1999 | Harkin |
| 6,002,410 A | 12/1999 | Battle |
| 6,005,582 A | 12/1999 | Gabriel et al. |
| 6,005,583 A | 12/1999 | Morrison |
| 6,005,584 A | 12/1999 | Kitamura et al. |
| 6,007,428 A | 12/1999 | Nishiumi et al. |
| 6,008,820 A | 12/1999 | Chauvin et al. .............. 345/502 |
| 6,011,562 A | 1/2000 | Gagne et al. |
| 6,011,565 A | 1/2000 | Kuo et al. |
| 6,014,144 A | 1/2000 | Nelson et al. |
| 6,016,150 A | 1/2000 | Lengyel et al. |
| 6,016,151 A | 1/2000 | Lin |
| 6,018,350 A | 1/2000 | Lee et al. |
| 6,020,931 A | 2/2000 | Bilbrey et al. |
| 6,021,417 A | 2/2000 | Massarksy |
| 6,022,274 A | 2/2000 | Takeda et al. |
| 6,023,261 A | 2/2000 | Ugajin |
| 6,023,738 A | 2/2000 | Priem et al. |
| 6,025,853 A | 2/2000 | Baldwin |
| 6,026,182 A | 2/2000 | Lee et al. |
| 6,028,608 A | 2/2000 | Jenkins |
| 6,028,611 A | 2/2000 | Anderson et al. |
| 6,031,542 A | 2/2000 | Wittig |
| 6,035,360 A | 3/2000 | Doidge et al. ............... 710/107 |
| 6,037,948 A | 3/2000 | Liepa |
| 6,037,949 A | 3/2000 | DeRose et al. |
| 6,038,031 A | 3/2000 | Murphy |
| 6,038,348 A | 3/2000 | Carley |
| 6,040,843 A | 3/2000 | Monroe et al. |
| 6,040,844 A | 3/2000 | Yamaguchi et al. |
| 6,041,010 A | 3/2000 | Puar et al. |
| 6,043,804 A | 3/2000 | Greene |
| 6,043,821 A | 3/2000 | Sprague et al. |
| 6,046,746 A | 4/2000 | Deering |
| 6,046,747 A | 4/2000 | Saunders et al. |
| 6,046,752 A | 4/2000 | Kirkland et al. |
| 6,049,337 A | 4/2000 | Van Overveld |
| 6,049,338 A | 4/2000 | Anderson et al. |
| 6,052,125 A | 4/2000 | Gardiner et al. |
| 6,052,126 A | 4/2000 | Sakuraba et al. |
| 6,052,127 A | 4/2000 | Vaswani et al. |
| 6,052,129 A | 4/2000 | Fowler et al. |
| 6,052,133 A | 4/2000 | Kang |
| 6,054,993 A | 4/2000 | Devic et al. |
| 6,054,999 A | 4/2000 | Strandberg |
| 6,057,847 A | 5/2000 | Jenkins |
| 6,057,849 A | 5/2000 | Haubner et al. |
| 6,057,851 A | 5/2000 | Luken et al. |
| 6,057,852 A | 5/2000 | Krech, Jr. |
| 6,057,859 A | 5/2000 | Handelman et al. |
| 6,057,861 A | 5/2000 | Lee et al. |
| 6,057,862 A | 5/2000 | Margulis |
| 6,057,863 A | 5/2000 | Olarig |
| 6,061,462 A | 5/2000 | Tostevin et al. |
| 6,064,392 A | 5/2000 | Rohner |
| 6,067,098 A | 5/2000 | Dye |
| 6,070,204 A | 5/2000 | Poisner |
| 6,072,496 A | 6/2000 | Guenter et al. |
| 6,075,543 A | 6/2000 | Akeley |
| 6,075,546 A | 6/2000 | Hussain et al. |
| 6,078,311 A | 6/2000 | Pelkey |
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,124 A | 7/2000 | Priem et al. |
| 6,092,158 A * | 7/2000 | Harriman et al. ............ 711/151 |
| 6,094,200 A | 7/2000 | Olsen et al. |
| 6,097,435 A | 8/2000 | Stanger et al. |
| 6,097,437 A | 8/2000 | Hwang |
| 6,104,415 A | 8/2000 | Gossett |
| 6,104,417 A | 8/2000 | Nielsen et al. |
| 6,105,094 A | 8/2000 | Lindeman |
| 6,108,743 A | 8/2000 | Debs et al. |
| 6,111,582 A | 8/2000 | Jenkins |
| 6,111,584 A | 8/2000 | Murphy |
| 6,115,047 A | 9/2000 | Deering |
| 6,115,049 A | 9/2000 | Winner et al. |
| 6,118,462 A | 9/2000 | Margulis |
| 6,128,026 A | 10/2000 | Brothers, III |
| 6,144,365 A | 11/2000 | Young et al. |
| 6,144,387 A | 11/2000 | Liu et al. |
| 6,151,602 A | 11/2000 | Hejlsberg et al. |
| 6,155,926 A | 12/2000 | Miyamoto et al. |
| 6,157,387 A | 12/2000 | Kotani |
| 6,166,748 A | 12/2000 | Van Hook et al. |
| 6,172,678 B1 | 1/2001 | Shiraishi |
| 6,173,367 B1 | 1/2001 | Aleksic et al. |
| 6,177,944 B1 | 1/2001 | Fowler et al. |
| 6,181,352 B1 | 1/2001 | Kirk et al. |
| 6,191,794 B1 | 2/2001 | Priem et al. |
| 6,198,488 B1 | 3/2001 | Lindholm et al. |
| 6,200,253 B1 | 3/2001 | Nishiumi et al. |
| 6,202,101 B1 * | 3/2001 | Chin et al. .................... 710/5 |
| 6,204,851 B1 | 3/2001 | Netschke et al. |
| 6,215,496 B1 | 4/2001 | Szeliski et al. |
| 6,215,497 B1 | 4/2001 | Leung |
| 6,226,012 B1 | 5/2001 | Priem et al. |
| 6,226,713 B1 | 5/2001 | Mehrotra |
| 6,232,981 B1 | 5/2001 | Gossett |
| 6,236,413 B1 | 5/2001 | Gossett et al. |
| 6,239,810 B1 | 5/2001 | Van Hook et al. |
| 6,252,608 B1 | 6/2001 | Snyder et al. |
| 6,252,610 B1 | 6/2001 | Hussain |
| 6,264,558 B1 | 7/2001 | Nishiumi et al. |
| 6,268,861 B1 | 7/2001 | Sanz-Pastor et al. |
| 6,275,235 B1 | 8/2001 | Morgan, III |
| 6,285,779 B1 | 9/2001 | Lapidous et al. |
| 6,292,194 B1 | 9/2001 | Powll, III |
| 6,295,586 B1 * | 9/2001 | Novak et al. ................ 711/154 |
| 6,329,997 B1 | 12/2001 | We et al. |
| 6,330,647 B1 * | 12/2001 | Jeddeloh et al. ............. 711/158 |
| 6,331,856 B1 | 12/2001 | Van Hook et al. |
| 6,339,428 B1 | 1/2002 | Fowler et al. |
| 6,342,892 B1 | 1/2002 | Van Hook et al. |
| 6,353,438 B1 | 3/2002 | Van Hook |
| 6,356,497 B1 | 3/2002 | Puar et al. |
| 6,408,362 B1 | 6/2002 | Arimilli et al. |
| 6,417,858 B1 | 7/2002 | Bosch et al. |
| 6,426,747 B1 | 7/2002 | Hoppe et al. |
| 6,437,781 B1 | 8/2002 | Tucker et al. |
| 6,459,429 B1 | 10/2002 | Deering |
| 6,466,223 B1 | 10/2002 | Dorbie et al. |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |
| 6,564,304 B1 * | 5/2003 | Van Hook et al. ........... 711/154 |

FOREIGN PATENT DOCUMENTS

| | | |
|---|---|---|
| EP | 0 637 813 A2 | 2/1995 |
| EP | 1 074 945 | 2/2001 |
| EP | 1 075 146 | 2/2001 |
| EP | 1 081 649 | 3/2001 |
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |

| | | |
|---|---|---|
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W-Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", © 2000 www.visiontek.com.
Jim Bushnell et al. "Advanced Multitexture Effects With Direct3D and OpenGL", Pyramid Peak Design & ATI Research, Inc., GameDevelopers Conference, © 1999.
Sony PlayStation II Instruction Manual, Sony Computer Entertainment Inc., © 2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, © 1999.
Press Releases, Mar. 18, 1999.
Chris Johnston, "PlayStation Part Deux", Press Start, © 1999.
Nikkei Shimbun, "Sony Making SME, Chemical and SPT into Wholly-Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit-Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.
Dreamcast Instruction Manual, Sega Enterprises, Ltd., © 1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot © 1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., © 1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second-Depth Shadow Mapping", Department of Computer Science, Univ. N.C, Chapel Hill, N.C. pp. 1-7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994,pp. 433-437.
James F. Blinn, "Simulationof Wrinkled Surfaces," Caltech/JPL, pp. 286-292, SIGGRAPH 78 (1978).
Thomas Möller and Eric Haines "Real-Time Rendering", AK Peters, Ltd., © 1999, pp. 127-142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump-mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump-mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000,www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per-Pixel Lighting (by S. Dietrich) Mar. 14, 2000 www.nvidia.com.

Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation, 1995-1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addison-Wesley Publishing Co., 1993.
"Procedural Elements for Computer Graphics," Second Edition, David F. Rogers, McGraw Hill,1998.
"Real-Time Rendering," Tomas Molleir, Eric Haines, AK Peters, 1999.
"Computer Graphics, Principles and Practice," Second Edition, The Systems Programming Series, Foley, van Dam, Fiener, Hughes, Addison Wesley, 1990.
"Principles of Three-Dimensional Computer Animation", Revised Edition, Michael O'Rourke, W.W. Norton & Company, 1998.
GDC 2000: Advanced OpenGL Game Development, "A Practical and Robust Bump-mapping Technique for Today's GPUs," by Mark Kilgard, Jul. 5, 2000, www.nvidia.com.
Technical Presentations: "Texture Space Bump Mapping," Sim Dietrich, Nov. 10, 2000, www.nvidia.com.
Whitepapers: "Texture Addressing," Sim Dietrich, Jan. 6, 2000, www.nvidia.com.
White paper, Huddy, Richard, "The Efficient Use of Vertex Buffers," (Nov. 1, 2000).
White paper, Spitzer, John, et al., "Using GL_NV_array_range and GL_NV_Fence on GEForce Products and Beyond" (Aug. 1, 2000).
White paper, Rogers, Douglas H., "Optimizing Direct3D for the GeForce 256" (Jan. 3, 2000).
Hook, Brian, "An Incomplete Guide to Programming DirectDraw and Direct3D Immediate Mode (Release 0.46)," printed from web site: www.wksoftware.com, 42 pages.

Thompson, Tom, "Must-See 3-D Engines," Byte Magazine, printed from web site www.byte.com, 10 pages (Jun. 1996).
Thompson, Nigel, "Rendering with Immediate Mode," Microsoft Interactive Developer Column: Fun and Games, printed from web site msdn.microsoft.com, 8 pages (Mar. 1997).
"Howto: Animate Textures in Direct3D Immediate Mode," printed from web site support.microsoft.com, 3 pages (last reviewed Dec. 15, 2000).
Info: Rendering a Triangle Using an Execute Buffer, printed from web site support.microsoft.com, 6 pages (last reviewed Oct. 20, 2000).
U.S. Appl. No. 09/337,293, filed Jun. 21, 1999, Multi-Format Vertex Data Processing Apparatus and Method [issued as U.S. Patent No. 6,501,479 B1 on Dec. 31, 2002].
Datasheet, SGS-Thomson Microelectronics, nVIDIA™, RIVA 128™ 128-Bit 3D Multimedia Accelerator (Oct. 1997).
Product Presentation, "RIVA128™ Leadership 3D Acceleration," 2 pages.
ZDNet Reviews, from PC Magazine, "Other Enhancements," Jan. 15, 1999, wysiwyg://16/http://www4.zdnet.com...ies/reviews/0,4161,2188286,00.html.
ZDNet Reviews, from PC Magazine, "Screen Shot of Alpha-channel Transparency," Jan. 15, 1999, wysiwyg://16/http://www4.zdnet.com...ies/reviews/0,4161,2188286,00.html.
Alpha (transparency) Effects, Future Technology Research Index, http://www.futuretech.vuurwerk.n1/alpha.html.
Blythe, David, 5.6 Transparency Mapping and Trimming with Alpha, http://toolbox.sgi.com/TasteOfDT/d...penGL/advanced98/node41.html, Jun. 11, 1998.
10.2 Alpha Blending, http://www.sgi.com/software/opengl/advanced98/notes/node146.html.
10.3 Sorting, http://www.sgi.com/software/opengVadvanced98/notes/node147.html.
10.4 Using the Alpha Function, http://www.sgi.com/software/opengl/advanced98/notes/node148.html.
Winner, Stephanie, et al., "Hardware Accelerated Rendering Of Antialiasing Using A Modified A-buffer Algorithm," Computer Graphics Proceedings, Annual Conference Series, 1997, pp. 307-316.
Debevec, Paul, et al., "Efficient View-Dependent Image-Based Rendering with Projective Texture-Mapping," University of California at Berkeley.
Gibson, Simon, et al., "Interactive Rendering with Real-World Illumination," Rendering Techniques 2000; 11th Eurographics Workshop on Rendering. pp. 365-376 (Jun. 2000).
Segal, Mark, et al., "Fast Shadows and Lighting Effects Using Texture Mapping," Computer Graphics, 26, 2, pp. 249-252 (Jul 1992).
White paper, Kilgard, Mark J., "Improving Shadows and Reflections via the Stencil Buffer" (Nov. 3, 1999).
"OpenGL Projected Textures," from web site:HTTP:// reality.sgi.com, 5 pages.
"5.13.1 How to Project a Texture," from web site: www.sgi.com, 2 pages.
Arkin, Alan, email, subject: "Texture distortion problem," from web site: HTTP://reality.sgi.com (Jul. 1997).
Moller, Tomas et al., "Real-Time Rendering," pp. 179-183 (AK Peters Ltd., 1999).
Williams, Lance, "Casting Curved Shadows on Curved Surfaces," Computer Graphics (SIGGRAPH '78 Proceedings), vol. 12, No. 3, pp. 270-274 (Aug. 1978).
Woo et al., "A Survey of Shadow Algorithms," IEEE Computer Graphics and Applications, vol. 10, No. 6, pp. 13-32 (Nov. 1990).
Heidrich et al., "Applications of Pixel Textures in Visualization and Realistic Image Synthesis," Proceedings 1999 Symposium On Interactive 3D Graphics, pp. 127-134 (Apr. 1999).
Hourcade et al, "Algorithms for Antialiased Cast Shadows", Computers and Graphics, vol. 9, No. 3, pp. 260-265 (1985).
Michael McCool, "Shadow Volume Reconstruction from Depth Maps", ACM Transactions on Graphics, vol. 19, No. 1, Jan. 2000, pp. 1-26.
RenderMan Artist Tools, PhotoRealistic RenderMan 3.8 User's Manual, Pixar (Aug. 1998).
RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," pp. 289-291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics 1999, Atlanta, 7 pages (Apr. 26-29, 1999).

Schlechtweg, Stefan et al., Rendering Line-Drawings with Limited Resources, Proceedings of GRAPHICON '96, 6th International Conference and Exhibition on Computer Graphics and Visualization in Russia, (St. Petersburg, Jul. 1-5, 1996) vol. 2, pp. 131-137.

Haeberli, Paul et al., "Texture Mapping as a Fundamental Drawing Primitive," Proceedings of the Fourth Eurographics Workshop on Rendering, 11 pages, Paris, France (Jun. 1993).

Schlechtweg, Stefan et al., "Emphasising in Line-drawings," Norsk samarbeid innen grafisk databehandling: NORSIGD Info, medlemsblad for NORSIGD, Nr 1/95, pp. 9-10.

Markosian, Lee et al., "Real-Time Nonphotorealistic Rendering," Brown University site of the NSF Science and Technology Center for Computer Graphics and Scientific Visualization, Providence, RI, 5 pages (undated).

Feth, Bill, Non-Photorealistic Rendering, wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.-Mar. 1998.

Zeleznik, Robert et al."Sketch: An Interface for Sketching 3D Scenes," Computer Graphics Proceedings, Annual Conference Series 1996, pp. 163-170.

Computer Graphics World, Dec. 1997.

Reynolds, Craig, "Stylized Depiction in Computer Graphics, Non-Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon-Looking Rendering of 3D Scenes," Syntim Project Inria, 6 pages, http://www-syntim.inria.fr/syntim/recherche/decaudin/cartoon-eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.cam-ani.co.uk/casweb/products/software/SceneIII.htm.

Mulligan, Vikram, "Toon," info sheet, 2 pages, http://digitalcarversguild.com/products/toon/toon.thml.

Toony Shaders, "Dang I'm tired of photorealism," 4 pages, http://www.visi.com/-mcdonald/toony.html.

"Cartoon Shading, Using Shading Mapping," 1 page, http://www.goat.com/alias/shaders.html#toonshad.

Web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar.

NVIDIA.com, technical presentation, "AGDC Per-Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

Slide Presentation, Sébastien Dominé, "nVIDIA Mesh Skinning, OpenGI".

Singh, Karan et al., "Skinning Characters using Surface-Oriented Free-Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A; Sep. 1, 1993, pp. 307-312.

Shade, Jonathan et al., "Layered Depth Images," Computer Graphics Proceedings, Annual Conference Series, pp. 231-242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of SIGGRAPH, pp. 269-276 (Aug. 8-13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109-116.

* cited by examiner

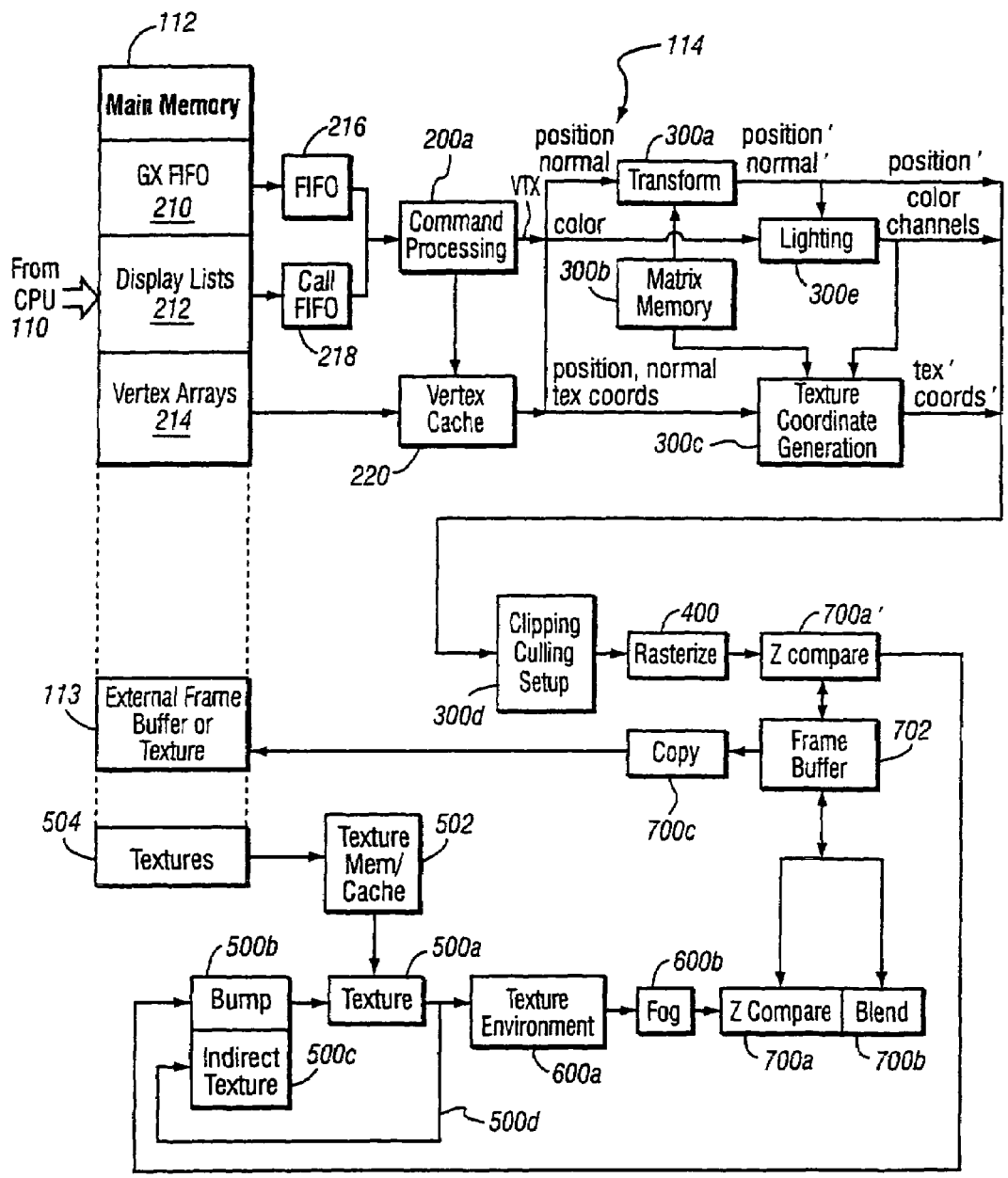
Fig. 5  EXAMPLE GRAPHICS PROCESSOR FLOW

Internal block diagrams

Read Data Path

GRAPHICS PROCESSING SYSTEM WITH ENHANCED MEMORY CONTROLLER

This application is filed in accordance with 35 U.S.C. § 119(e)(1) and claims the benefit of the provisional application Ser. No. 60/226,894 filed on Aug. 23, 2000, entitled "Graphics Processing System With Enhanced Memory Controller."

FIELD OF THE INVENTION

The present invention relates to computer graphics, and more particularly to interactive graphics systems such as home video game platforms. Still more particularly this invention relates to a memory controller for use in such an interactive graphics system that controls resource access to main memory.

RELATED APPLICATIONS

This application is particularly related to application Ser. No. 60/226,886, entitled "Method and Apparatus For Accessing Shared Resources", which is hereby incorporated by reference. This application is also related to the following applications identified below, which focus on various aspects of the graphics processing described herein. Each of the following applications are hereby incorporated herein by reference.

provisional Application No. 60/161,915, filed Oct. 28, 1999 and its corresponding utility application Ser. No. 09/465,754, filed Dec. 17, 1999, both entitled "Vertex Cache For 3D Computer Graphics", provisional Application No. 60/226,912, filed Aug. 23, 2000 and its corresponding utility application Ser. No. 09/726,215, filed Nov. 28, 2000, both entitled "Method and Apparatus for Buffering Graphics Data in a Graphics System", provisional Application No. 60/226,889, filed Aug. 23, 2000 and its corresponding utility application Ser. No. 09/722,419, filed Nov. 28, 2000, both entitled "Graphics Pipeline Token Synchronization", provisional Application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System", provisional Application No. 60/226,888, filed Aug. 23, 2000 and its corresponding utility application Ser. No. 09/722,367, filed Nov. 28, 2000, both entitled "Recirculating Shade Tree Blender For A Graphics System", provisional Application No. 60/226,892, filed Aug. 23, 2000 and its corresponding utility application Ser. No. 09/726,218, filed Nov. 28, 2000, both entitled "Method And Apparatus For Efficient Generation Of Texture Coordinate Displacements For Implementing Emboss-Style Bump Mapping In A Graphics Rendering System", provisional Application No. 60/226,893, filed Aug. 23, 2000 and its corresponding utility application Ser. No. 09/722,381 filed Nov. 28, 2000, both entitled "Method And Apparatus For Environment-Mapped Bump-Mapping In A Graphics System", provisional Application No. 60/227,007, filed Aug. 23, 2000 and its corresponding utility application Ser. No. 09/726,216, filed Nov. 28, 2000, both entitled "Achromatic Lighting in a Graphics System and Method", provisional Application No. 60/226,900, filed Aug. 23, 2000 and its corresponding utility application Ser. No. 09/726,226, filed Nov. 28, 2000, both entitled "Method And Apparatus For Anti-Aliasing In A Graphics System", provisional Application No. 60/226,910, filed Aug. 23, 2000 and its corresponding utility application Ser. No. 09/722,380, filed Nov. 28, 2000, both entitled "Graphics System With Embedded Frame Buffer Having Reconfigurable Pixel Formats", utility application Ser. No. 09/585,329, filed Jun. 2, 2000, entitled "Variable Bit Field Color Encoding", provisional Application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode", provisional Application No. 60/226,915, filed Aug. 23, 2000 and its corresponding utility application Ser. No. 09/726,212 filed Nov. 28, 2000, both entitled "Method And Apparatus For Providing Non-Photorealistic Cartoon Outlining Within A Graphics System", provisional Application No. 60/227,032, filed Aug. 23, 2000 and its corresponding utility application Ser. No. 09/726,225, filed Nov. 28, 2000, both entitled "Method And Apparatus For Providing Improved Fog Effects In A Graphics System", provisional Application No. 60/226,885, filed Aug. 23, 2000 and its corresponding utility application Ser. No. 09/722,664, filed Nov. 28, 2000, both entitled "Controller Interface For A Graphics System", provisional Application No. 60/227,033, filed Aug. 23, 2000 and its corresponding utility application Ser. No. 09/726,221, filed Nov. 28, 2000, both entitled "Method And Apparatus For Texture Tiling In A Graphics System", provisional Application No. 60/226,899, filed Aug. 23, 2000 and its corresponding utility application Ser. No. 09/722,667, filed Nov. 28, 2000, both entitled "Method And Apparatus For Pre-Caching Data In Audio Memory", provisional Application No. 60/226,913, filed Aug. 23, 2000 and its corresponding utility application Ser. No. 09/722,378, filed Nov. 28, 2000, both entitled "Z-Texturing", provisional Application No. 60/227,031, filed Aug. 23, 2000 entitled "Application Program Interface for a Graphics System", provisional Application No. 60/227,030, filed Aug. 23, 2000 and its corresponding utility application Ser. No. 09/722,663, filed Nov. 28, 2000, both entitled "Graphics System With Copy Out Conversions Between Embedded Frame Buffer And Main Memory", provisional Application No. 60/226,886, filed Aug. 23, 2000 and its corresponding utility application Ser. No. 09/722,665, filed Nov. 28, 2000, both entitled "Method and Apparatus for Accessing Shared Resources", provisional Application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and provisional Application No. 60/227,006, filed Aug. 23, 2000 and its corresponding utility application Ser. No. 09/722,421, filed Nov. 28, 2000, both entitled "Shadow Mapping In A Low Cost Graphics System".

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

In generating exciting 3D animations and simulations on relatively inexpensive computer graphics systems, it is important to efficiently control access to main memory among competing resources. Any such access control system is burdened with considerable constraints. For example, the main application program executing CPU, which is but one of many resources seeking access to main memory, must be granted memory access with a fixed memory read latency allowing for high speed execution of instructions. Accordingly, such a CPU should be awarded high priority access to main memory. In order to generate exciting graphics, certain graphics related resources seeking memory access must likewise be guaranteed high speed access to memory sufficient for the graphics processing to be rapidly completed.

The present invention is embodied in the disclosed illustrative memory controller described herein, which performs a wide range of memory control related functions including arbitrating between various competing resources seeking access to main memory. Other tasks performed by the unique memory controller include handling memory latency and bandwidth requirements of the resources requesting memory access, buffering writes to reduce turn around, refreshing main memory, protecting main memory using programmable registers, and numerous other functions.

In controlling memory access between resources seeking to read from and write to main memory, the memory controller minimizes switching between memory reads and memory writes to avoid wasting memory bandwidth due to idle cycles resulting from such switching and thereby enhancing memory access time. The illustrative memory controller minimizes such switching by incorporating a unique write buffering methodology that uses a "global" write queue which queues write requests from various diverse competing resources to reduce read/write switching. In this fashion, multiple competing resources for memory writes are combined into one resource from which write requests are obtained.

The memory controller in accordance with the illustrative embodiment described herein, advantageously optimizes access to main memory taking into account resource memory latency and bandwidth requirements.

The memory controller described herein uniquely resolves memory coherency issues to avoid accessing stale data from memory due to reading data from a main memory address location prior to when that same location had been updated by a write operation. Coherency issues are addressed both within a single resource that has both read and write capability and difference resources. The exemplary embodiment addresses such coherency issues by efficiently flushing buffers associated with a resource. For example, a resource that is writing to main memory may send a flush signal to the memory controller to indicate that the resource's write buffer should be flushed. In accordance with an exemplary implementation, the memory controller generates a flush acknowledge handshake signal to indicate to competing resources that data written to main memory is actually stored in main memory rather than in an associated resource buffer.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

DETAILED DESCRIPTION OF EXAMPLE EMBODIMENTS OF THE INVENTION

Figure 1:
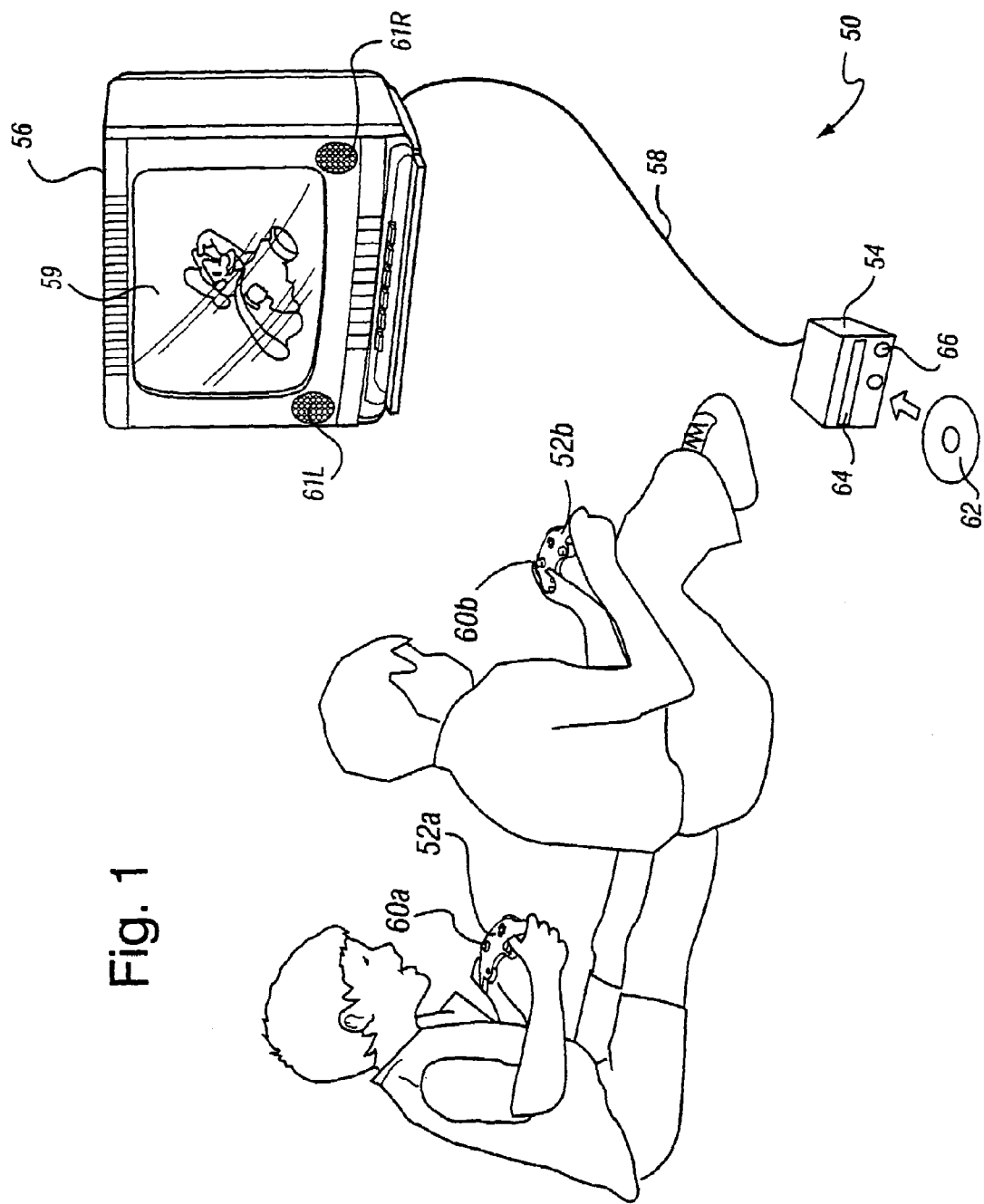
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52a and 52b can take a variety of forms. In this example, controllers 52 shown each include controls 60a or 60b such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52a, 52b to provide inputs to main unit 54. For example, operating a control 60a, 60b may cause the game or other application to start. Moving other controls 60a, 60b can cause animated characters to move in different directions or change the user's point of view in a 3D world. Depending upon the particular software stored within the storage medium 62, the various controls 60a, 60b on a controller 52a, 52b can perform different functions at different times.

Example Electronics of Overall System

Figure 2:
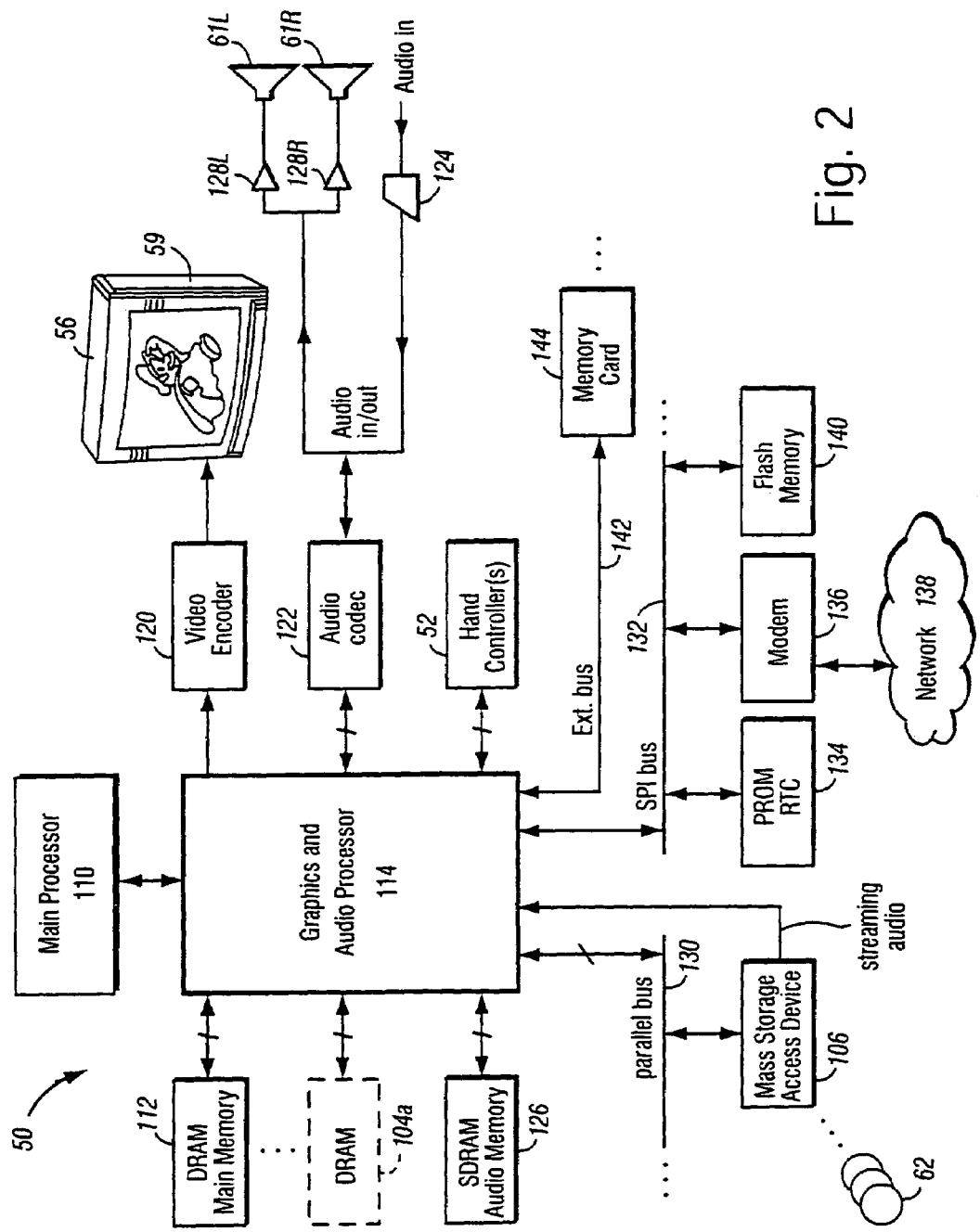
FIG. 2 is a block diagram of the FIG. 1 example computer graphics system.

FIG. 2 shows a block diagram of example components of system 50. The primary components include:
 a main processor (CPU) 110,
 a main memory 112, and
 a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate dynamic visual images on display 59 and high quality stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
 a programmable read-only memory and/or real time clock 134,
 a modem 136 or other networking interface (which may in turn connect system 50 to a telecommunications network 138 such as the Internet or other digital network from/to which program instructions and/or data can be downloaded or uploaded), and
 flash memory 140.

A further external bus 142, which may, by way of example only, be a serial bus, and may be used to communicate with additional expansion memory 144 (e.g., a memory card) or other devices. Connectors may be used to connect various devices to busses 130, 132, 142.

Example Graphics and Audio Processor

Figure 3:
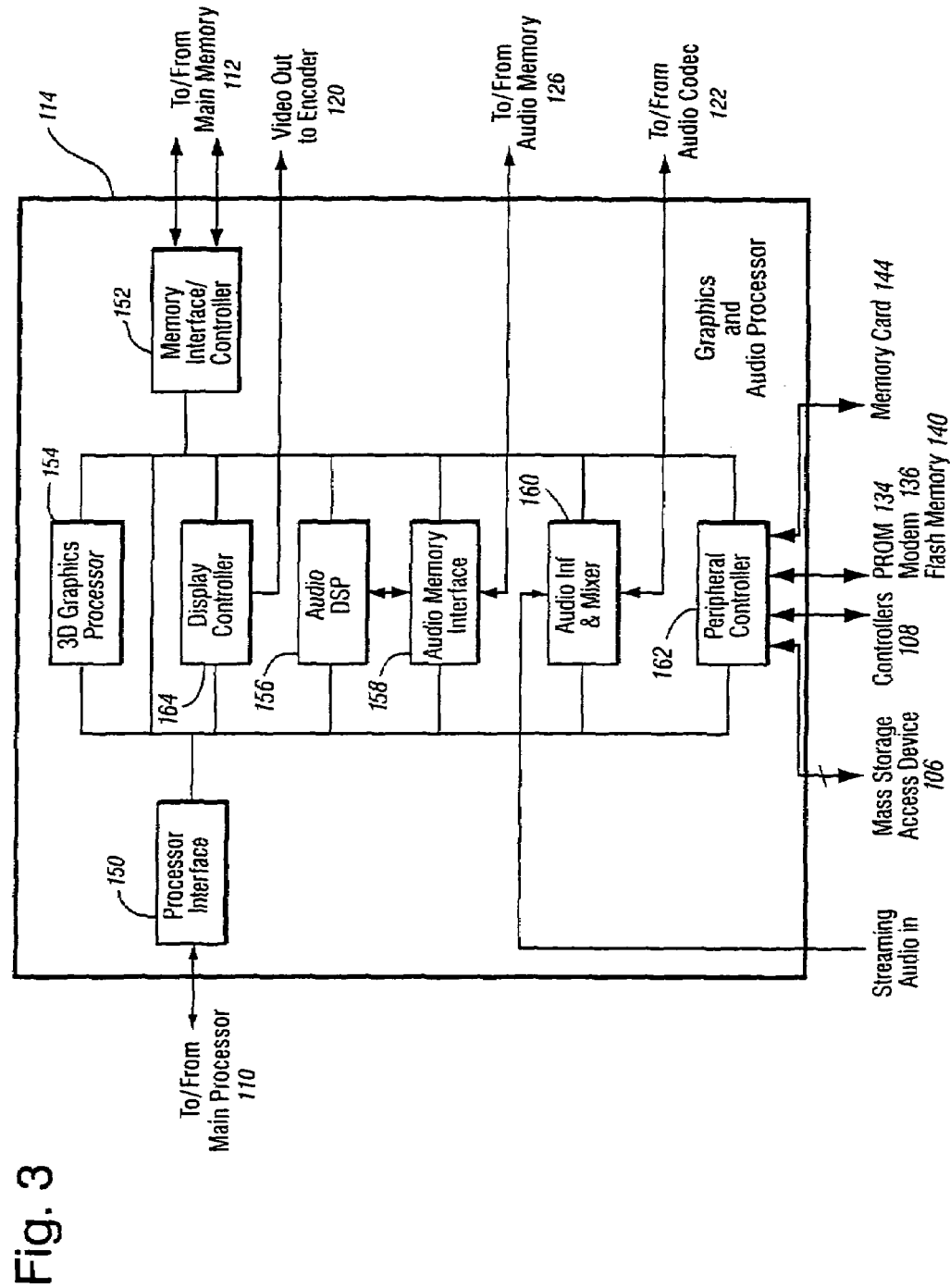
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

As will be explained in detail below, memory interface 152 provides a data and control interface between graphics and audio processor 114 and memory 112. In this example, main processor 110 accesses main memory 112 via a processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
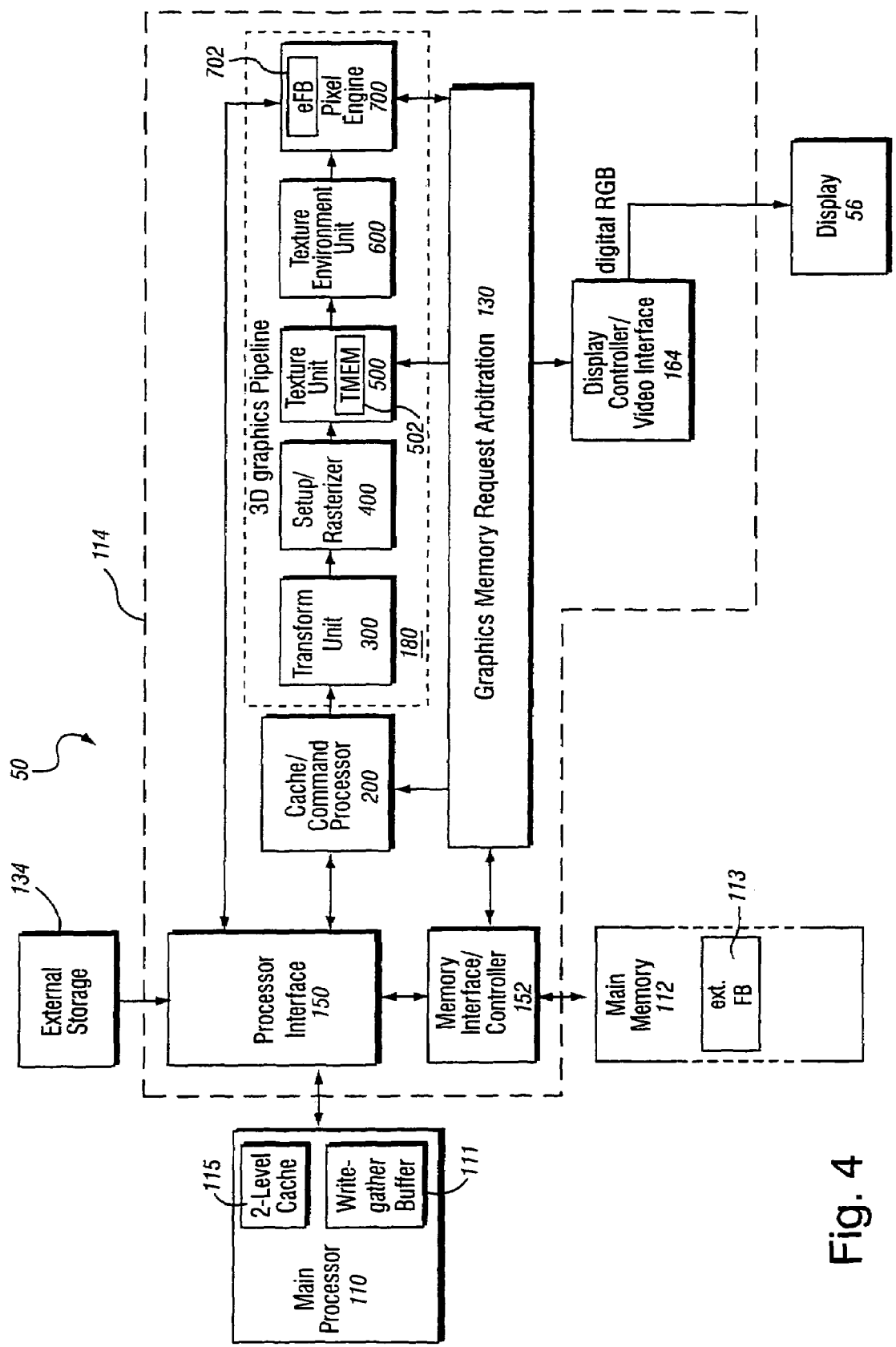
FIG. 4 is a block diagram of the example 3D graphics processor shown in FIG. 3.

FIG. 4 shows a graphics processing system including a more detailed view of an exemplary FIG. 33D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112 via memory controller 152. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a block logical flow diagram portraying illustrative processing performed using graphics processor 154. Main processor 110 may store graphics command streams 210, display lists 212 and vertex arrays 214 in main memory 112, and pass pointers to command processor 200 via processor/bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

- retrieving textures 504 from main memory 112,
- texture processing (500a) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a*' can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects. Antialiasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 56.

Figure 6A:
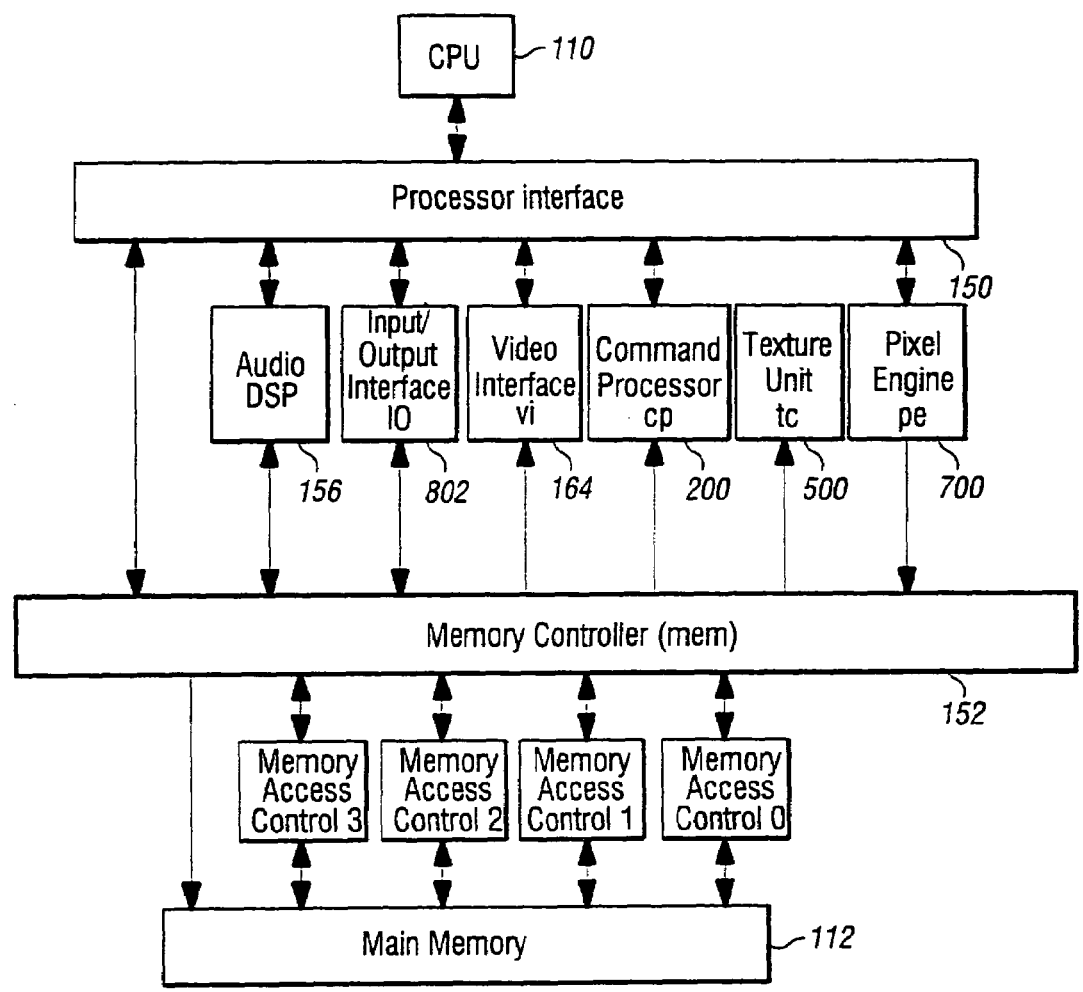
FIGS. 6A and 6B are block diagrams depicting memory controller and competing resources coupled thereto.
Figure 6B:
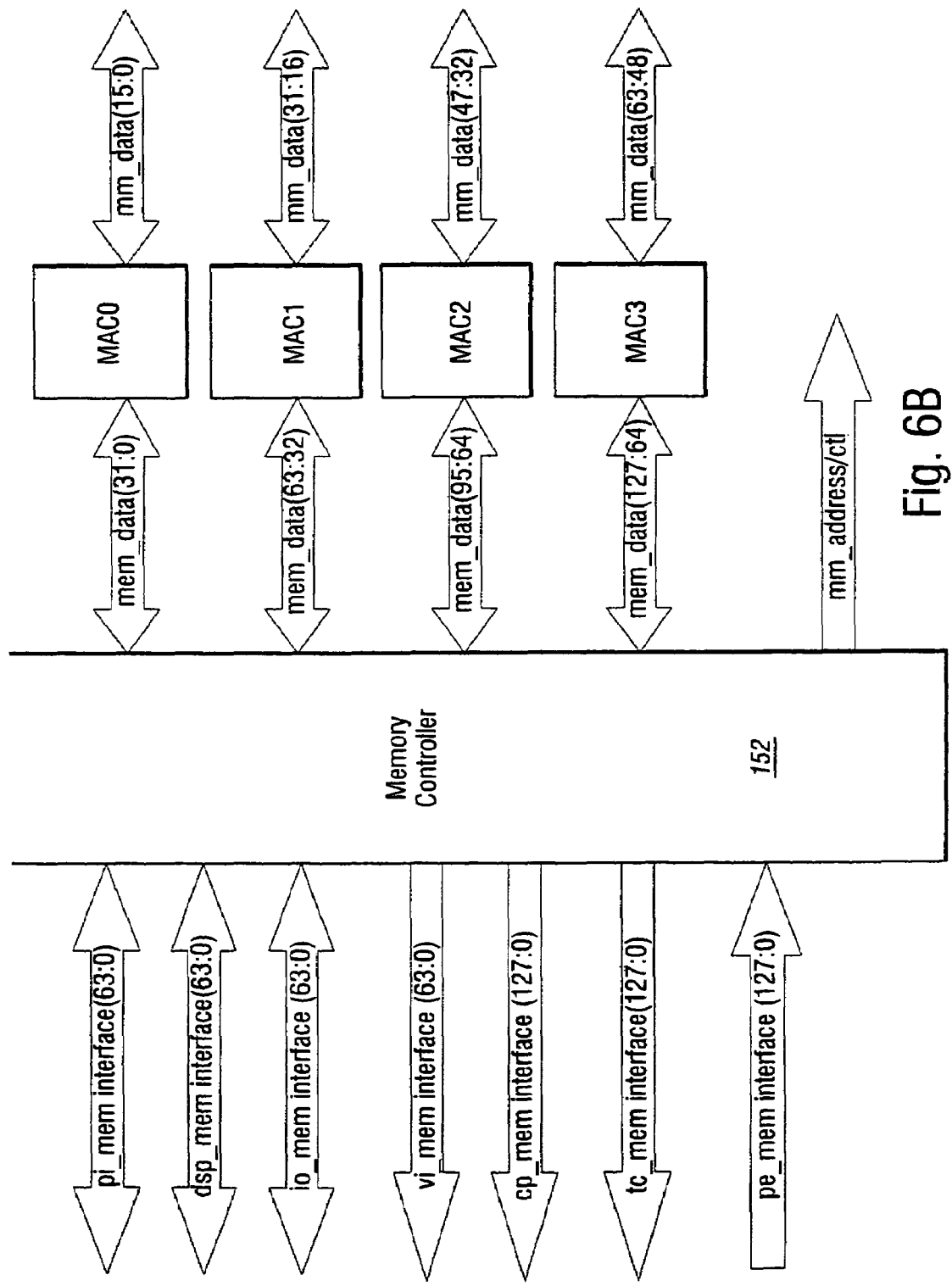

FIGS. 6A and 6B are illustrative block diagrams depicting memory controller 152 (FIGS. 3 and 4) and various resources coupled thereto which compete for access to main memory 112. Main memory 112 may, for example, comprise an SRAM, such as a 1TSRAM, manufactured by Mosys Corporation, which automatically performs internal refresh operations. Memory interface controller 152 provides a data and control interface between main processor 110, graphics and audio processor 114 and main memory 112. Although memory controller 152 and graphics memory request arbitration 130 are depicted as separate components in FIG. 4, in the illustrative implementation described below, memory controller 152 also includes graphics memory request arbitration 130.

As shown in FIGS. 6A and 6B, memory controller 152 is coupled to various competing resources seeking to access main memory 12. Such competing resources include processor interface (PI) 150 (which is coupled to main processor 110), audio DSP (DSP) 156, input/output interface (IO) 802, video interface (VI) 164, cache/command processor (CP) 200, texture unit (TC) 500, and pixel engine (PE) 700. In this exemplary embodiment, of these resources, processor interface 150, audio DSP 156 and IO interface 802 are operable to both read information from and write information to main memory 112. IO interface 802 is operable to itself arbitrate and interface with a wide range of input/output devices such as modem, DVD interface and has relatively low memory bandwidth requirements. In the present illustrative embodiment, video interface 164, cache/command processor 200, and texture unit 500 are operable to only read information from main memory 112, and pixel engine 700 is operable to only write information to main memory 112.

Memory controller 152 performs various memory controller tasks including: 1) arbitrating among, for example, the 7 ports depicted in FIGS. 6A and 6B for access to main memory 112, 2) granting memory access taking into account memory latency and bandwidth requirements of the resources requesting memory access, 3) buffering writes to reduce access turn around, 4) refreshing main memory 112 when necessary, and 5) protecting main memory 112 using programmable registers. Although the illustrative embodiment shown in FIGS. 6A and 6B, depicts 7 ports seeking memory access, as will be appreciated by those skilled in the art, there may be greater or fewer than 7 ports in any given implementation. Moreover, the bus/signal line widths shown in FIG. 6B and other Figures (as well as other implementation details) are presented for illustrative purposes only and should in no way be construed as limiting the scope of the present invention. Memory controller 152 performs arbitration among the identified ports and sends requests to the main memory 112. In the illustrative embodiment, memory controller 152 and all of its inputs and outputs run at 200 MHz. A 128 bit 200 MHz data path is up clocked at up to 400 MHz through the 4-channel Memory Access Control (MAC) block to permit communication with a 400 MHz external 1TSRAM memory. The MAC stores data received over respective 32 bit paths and clocks out the data at the appropriate clock rate. The address and control signals shown in FIG. 6B are directly connected to the IO pins. The particular signaling used to communicate with main memory 112 is not a part of this invention.

In accordance with one exemplary embodiment of the memory controller resource arbitration methodology (and as further described in co-pending application Ser. No. 60/226,886, entitled "Method and Apparatus For Accessing Shared Resources", which application is hereby incorporated herein by reference), a bandwidth control is uniquely associated with each of the above-identified resources to permit an application programmer to control the bandwidth allocation of, for example, the 3.2 gigabyte's main memory 112 bandwidth. For example, programmable bandwidth control registers are respectively associated with command processor 200 and texture unit 500, which may be utilized to allocate more of the available main memory bandwidth to the command processor 200 than to texture unit 500. In this fashion, sophisticated users are able to tune the above-identified competing interface drivers to their particular application needs to get better overall performance. Accordingly, for each of the above-identified competing interfaces, a register is utilized to control its allocation of memory bandwidth to ensure that for every n number of clock cycles, a request for memory arbitration will be granted. Thus, for each interface, a filter is utilized which will, for example, slow down a request for main memory access if a particular interface is generating a large number of requests at a time when other interfaces are likewise generating requests. Alternatively, if main memory 112 is idle, and no other unit is contending for memory access, then such a request for access may be granted. The filter may define the speed at which requests for a given interface may be granted when other requests from different interfaces are being simultaneously entertained.

Memory controller 152 controls a wide range of graphics data related requests for main memory 112 involving for example:

3D graphics processor 154 (specifically, command processor 200, texture unit 500 and pixel engine 700), main processor 110 via processor interface 150, audio DSP 156, display controller 164, and peripheral controller 162 for various I/O units (e.g., mass storage access device 106)

Figure 7:
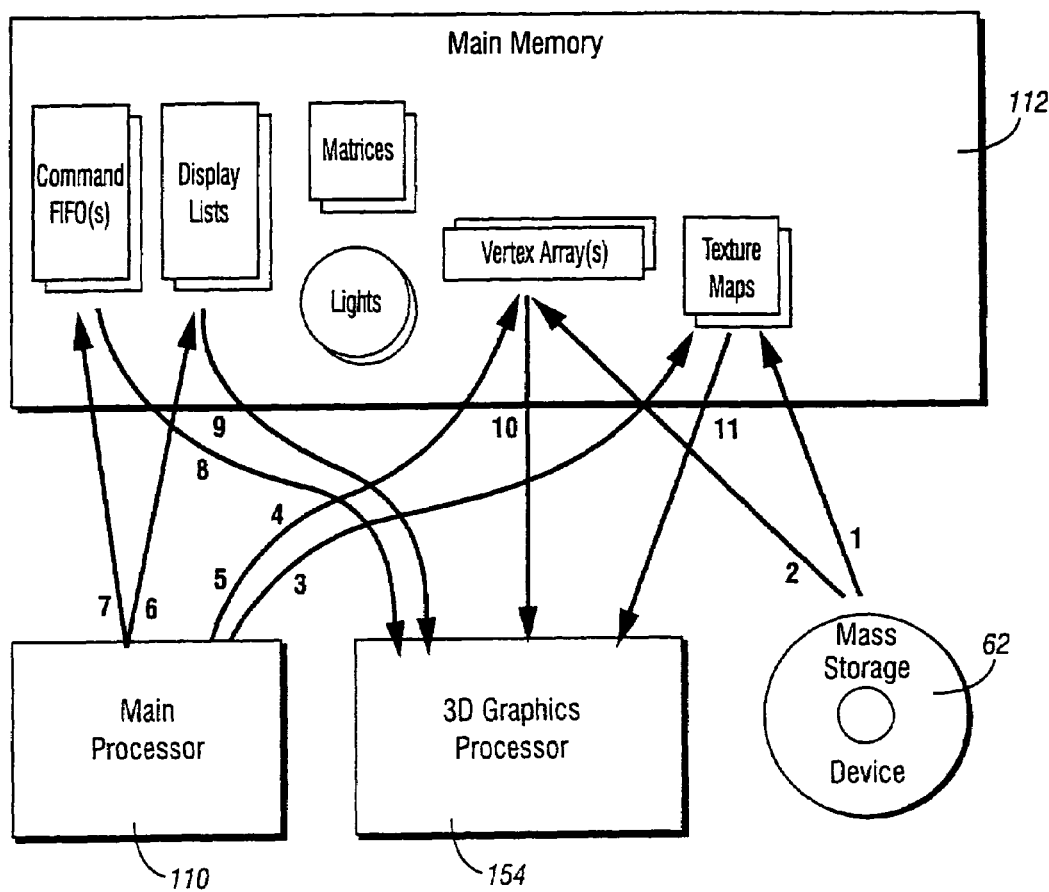
FIG. 7 is an exemplary block diagram depicting various resources accessing main memory.

FIG. 7 illustrates some of the typical operations involved in these "requestors" competing for access to main memory. The arrows in FIG. 7 represent the following operations:

1. Loading texture images from mass storage device 62 (e.g., DVD) to main memory 112 for a new image, game sector or level, or other application sequence 2. Loading geometry vertex arrays from mass storage device 62 to main memory for a new image, game sector or level, or other application sequence 3. Dynamic rendering of texture maps by main processor 110 or graphics processor 154

4. Dynamic generation or modification of vertex arrays by main processor 110

5. Main processor 110 animating lights and transformation matrices for consumption by graphics processor 154

6. Main processor 110 generating display lists for consumption by graphics processor 154

7. Main processor 110 generating graphics command streams 8. 3D graphics processor 154 reading graphics command stream 9. 3D graphics processor 154 reading display lists 10. 3D graphics processor 154 accessing vertices for rendering 11. 3D graphics processor 154 accessing textures for rendering In the illustrative implementation, the graphics processor 114 has several data memory requirements including alignment requirements for the following types of data: texture and texture lookup table images, display lists, graphics FIFO and the external frame buffer. These data objects should be aligned because the graphics processor 114 is very fast; data from the main memory 112 is transferred in 32-byte chunks. Data alignment allows for simple and fast hardware.

On other data objects, such as vertex, matrix and light arrays, in an exemplary embodiment additional hardware support eliminates the need for coarse alignment (these are 4-byte aligned). There are a large number of these data objects, and the memory consumption of each object is potentially low, so relaxing alignment restrictions helps to conserve memory.

In accordance with the illustrative implementation, multiple processors and hardware blocks can update main memory. In addition, the CPU 110 and graphics processor 114 contain various data caches. Since the hardware does not maintain coherency of the data in main memory and various associated caches, there are various potential sources of coherency problems including when the CPU modifies or generates data destined for the graphics processor 114, when the CPU writes data through its write-gather buffer to cached memory, and when loading new data destined for the graphics processor 114 from the DVD into main memory. Coherency problems may occur if the main memory used to store the data in these two latter cases were used for other graphics data.

When the DVD loads data, the DVD API automatically invalidates the loaded main memory portion that resides in the CPU data cache. This feature provides a safe method for programmers to modify the DVD loaded data without worrying about CPU data cache coherency. This DVD API feature activates by default; it can be deactivated by the programmer.

The graphical data loaded by DVD may contain textures and vertices that have been already formatted for the graphics processor 114 to render. Therefore, invalidation of the vertex cache and texture cache regions may be necessary.

The CPU 110 has two means of writing to main memory: the write-gather buffer and the CPU cache hierarchy. The write-gather buffer is normally used to "blast" graphics commands into memory without affecting the cache. As a result, information sent through the write-gather buffer is not cache coherent. Care must be taken when using the write-gather buffer to avoid writing to areas of memory that maybe found in the CPU cache. The cache flushing instructions shown below maybe used to force data areas out of the CPU cache.

If the CPU generates or modifies graphics data through its cache, the following memory types may end up containing stale data:

Main memory.

graphics processor 114 vertex cache and texture cache regions.

To send the correct data to the graphics processor 114, in accordance with the exemplary embodiment, there is a need to flush the CPU data cache as well as invalidate the graphics processor 114 vertex or texture cache. The CPU typically animates data one frame ahead of the graphics processor 114, so efficient techniques to maintain data coherency include:

Grouping all the CPU-modified graphics data in main memory sequentially, so that the block data cache flush is efficient.

Invalidating the vertex cache, as well as the entire texture cache, at the beginning of each graphics frame.

These operations are mentioned by way of illustrating some of the many operations involving reading and writing to main memory 112. Among other things, memory controller 152 arbitrates among the ports involved in main memory reading and writing operations.

Figure 8:
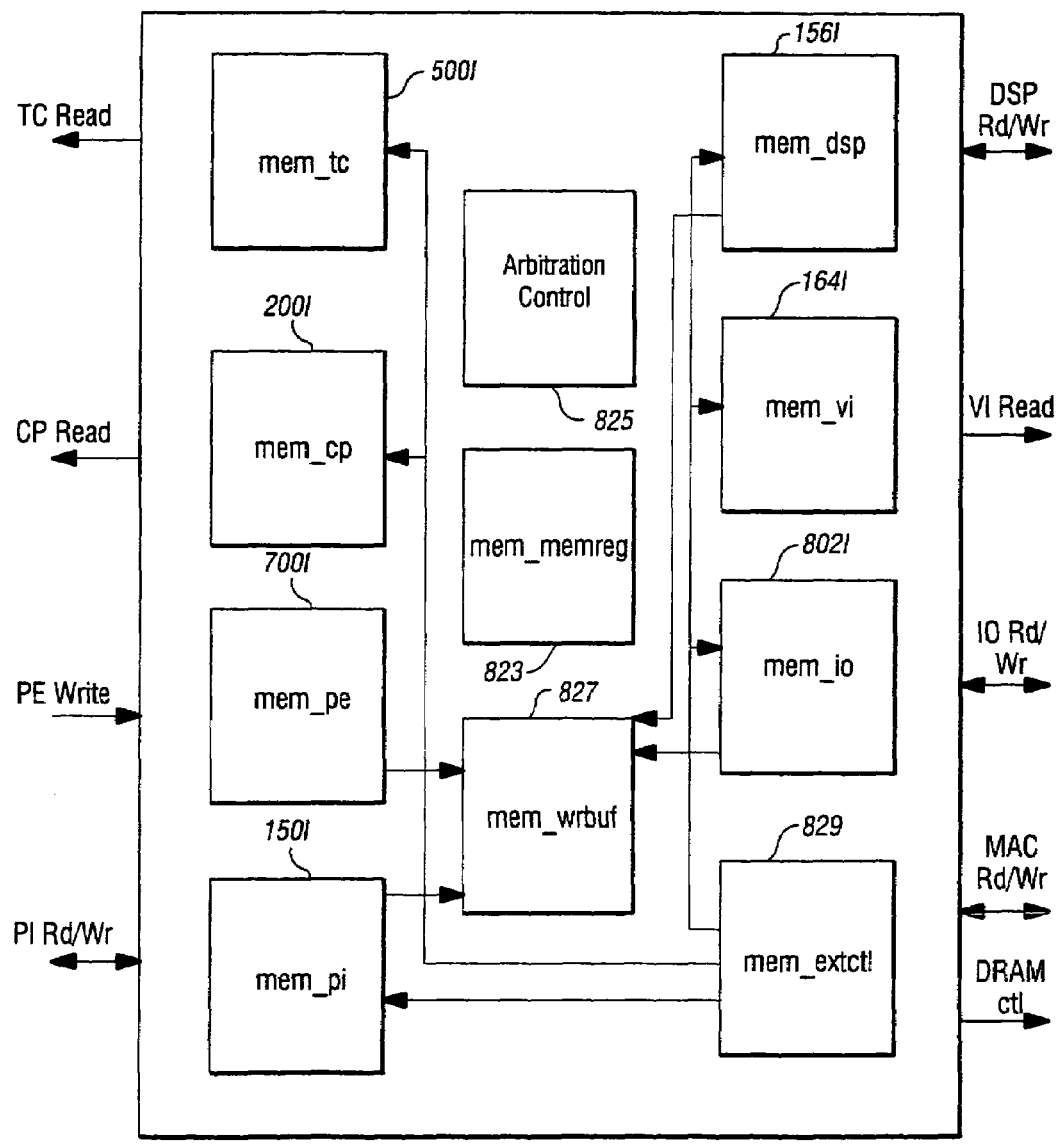
FIG. 8 is a more detailed block diagram of the memory controller shown in FIGS. 6A and 6B.

FIG. 8 is a more detailed block diagram of memory controller 152. As shown in FIG. 8, memory controller 152 includes individual "local" interfaces associated with each of the competing resources shown in FIGS. 6A and 6B. A controller pi interface 150I interfaces with processor interface 150, controller DSP interface 156I interfaces with audio DSP 156, controller io interface 802I interfaces with input output interface 802, controller video interface 164I interfaces with video interface 164, controller cp interface 200I interfaces with command processor 200, controller tc interface 500I interfaces with texture unit 500, and interface pe 700I interfaces with pixel engine 700. Memory controller 152 is coupled to main memory via external memory control 829, which is shown in further detail in FIG. 16 described below. External memory control as shown in FIG. 16 generates a read/write control signal which switches the bidirectional memory bus between read and write states.

Figure 9:
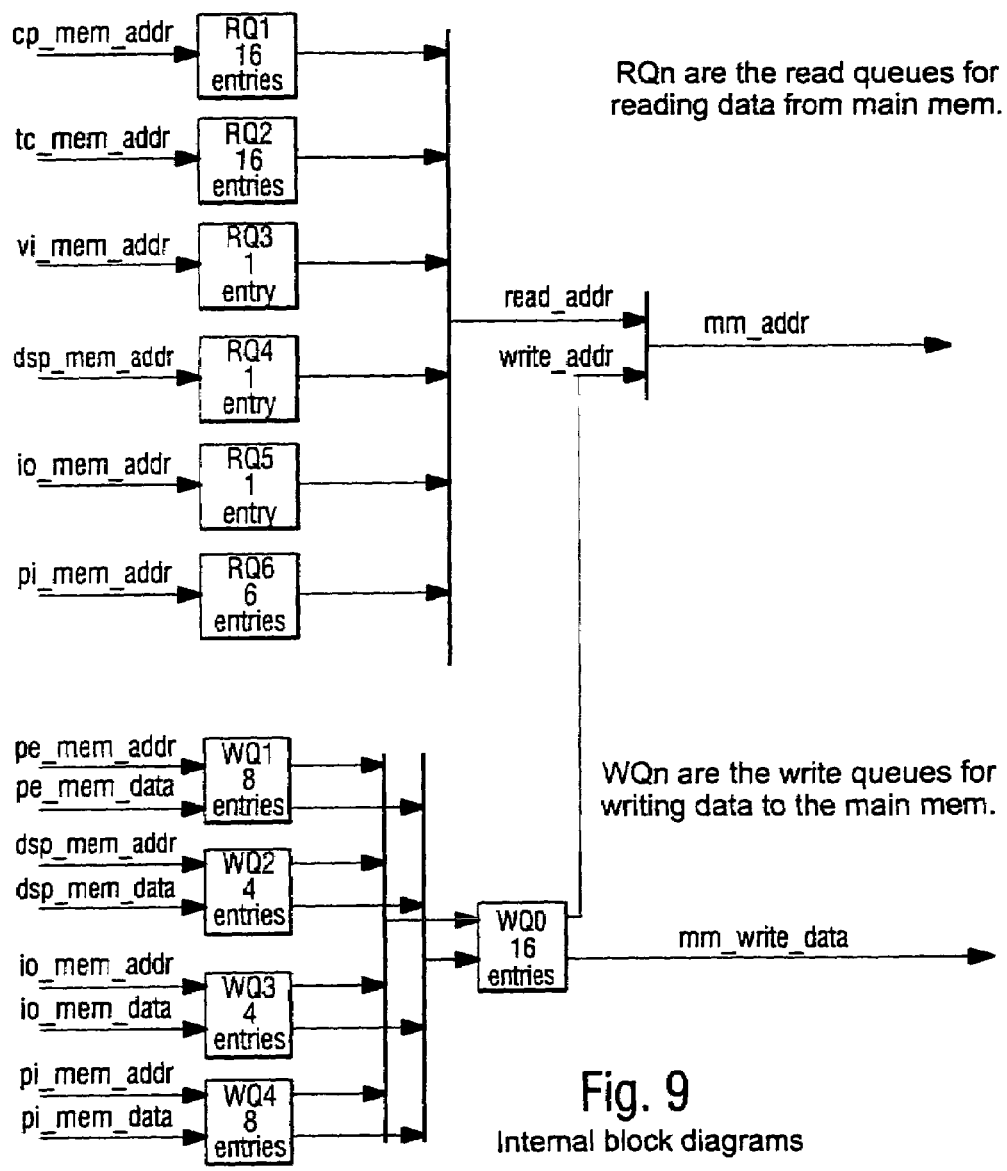
FIG. 9 illustrates a memory controller address path.

Focusing, for illustration purposes on the texture coordinate interface 500I, this interface is coupled to the read only texture unit 500 shown in FIGS. 6A and 6B. TC interface 500I (like each of the local interfaces coupled to resources which read from main memory) includes a read queue (RQ2 shown in FIG. 9) for queuing read requests and associated memory addresses received from its associated resource, texture unit 500. Memory controller interfaces pe, dsp, io, and pi also respectively include a local write queue WQ0-4 as shown in FIG. 9 for queuing write requests.

Turning back to FIG. 8, arbitration control 825 includes the control logic for implementing the arbitration methodology, which is described in further detail below and in the above-identified co-pending application Ser. No. 60/226,886 entitled "Method and Apparatus for Accessing Shared Resources" which has been incorporated herein by reference. Arbitration control 825 is alerted to the presence of, for example, the receipt of a read request in texture interface 500I. Similarly, interfaces 200I, 700I, 150I, 156I, 164I, 802I and 829 are operatively coupled to arbitration control 825 for arbitration of competing memory access requests. As will be explained further below, arbitration control 825 upon receipt of read requests from, for example, memory TC interface 500I and DSP interface 156I (if, for example, 500I and 156I were the only competing resources) may award a first memory cycle to texture unit TC and the next memory cycle to DSP 156, etc. Thus, the read requests may be granted on a round robin basis. Arbitration controller 825 is aware of all pending requests and grants as described in the above-identified co-pending patent application and as set forth further below.

Figure 10:
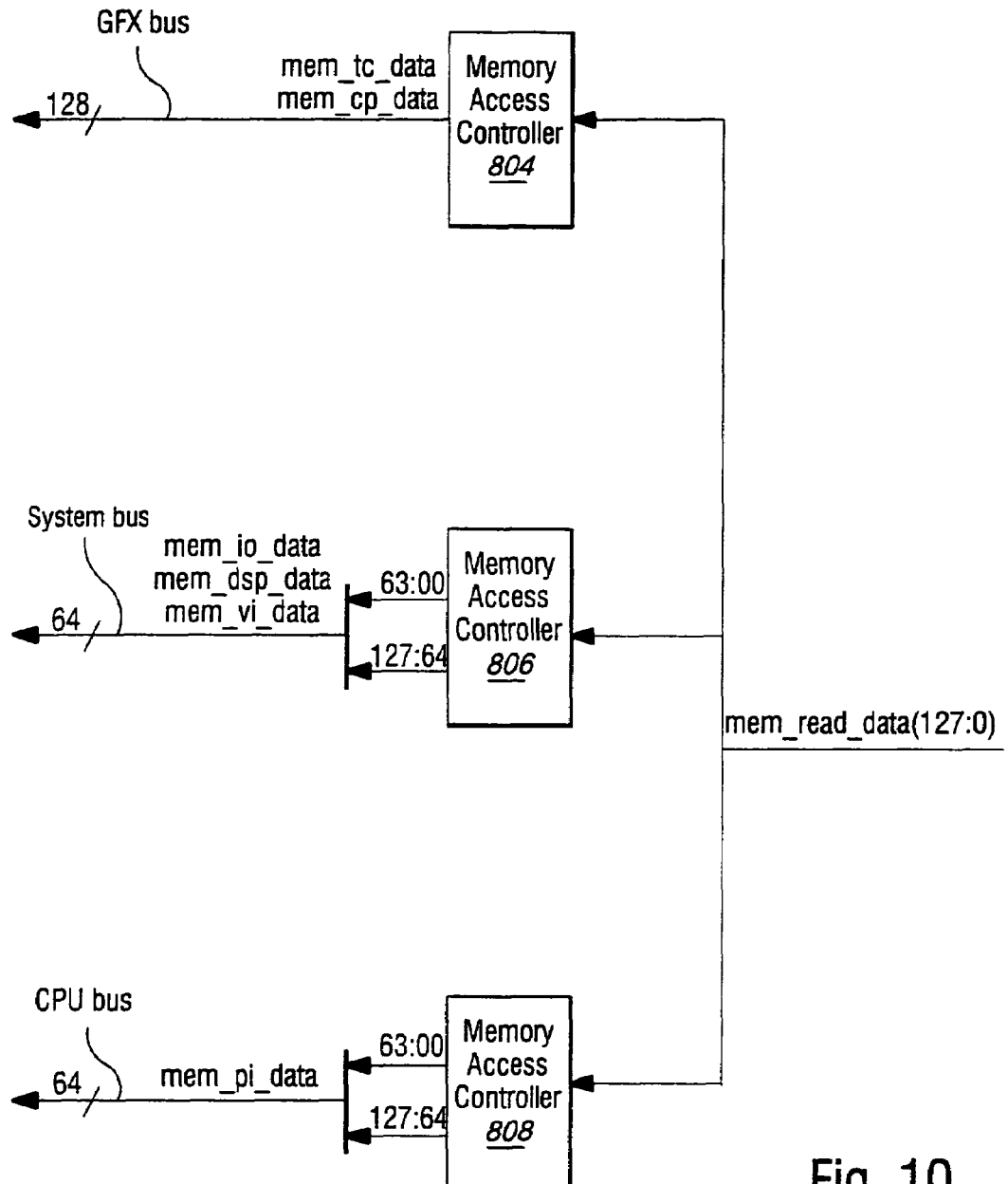
FIG. 10 illustrates a memory controller read data path.

As suggested by the read data path illustrated in FIG. 10, texture unit TC has a high bandwidth requirement (e.g., see the 128 bit GFX data path which is the same width as the main memory data path). The texture unit thus may be granted a request without wasting memory bandwidth. DSP, as shown in FIG. 10, has a 64 bit bandwidth and will be awarded priority by the arbitration control 825 in a manner designed not to waste memory cycles.

The arbitration control 825 may, for example, be a state machine which sequences through states that implement the arbitration methodology described below. As explained in detail in the above-identified copending patent application, the arbitration control 825 is controlled in part by bandwidth dial registers such that when (for example) there is a request for memory access from texture unit 500, the request may be effectively suppressed. Thus, in a video game in which there is a large amount of texture data, the system may be tuned to adjust the bandwidth to optimize it for that particular game's memory access needs.

More specifically, as stated above, each of the read "masters" (i.e., a resource seeking to access main memory 112) is associated with a respective corresponding one of read queues RQ1 to RQ6 for queuing read addresses for reading from main memory 112. Each of the write masters seeking to access main memory 112 is associated with a respective corresponding one of write queues WQ1 to WQ4 for queuing write addresses and corresponding data for writing to main memory 112. Arbitration control 825 uses a predetermined arbitration process to allocate main memory access among the read queues RQ1 to RQ6 and to control which write requests among the write queues WQ1 to WQ4 are provided to global write buffer WQ0. The rate at which at least some of the requests are fed into this arbitration process is controllable in accordance with the settings of programmable bandwidth dial registers. By appropriately setting the dial registers for a particular operation, sophisticated users can tune the flow of requests to the arbitration process to improve system performance for that operation.

By collecting the write requests into the global write buffer WQ0, read to write and write to read switching may be reduced, thereby minimizing the dead memory cycles that result when the main memory is changed from one type of operation to the other. While write requests are supplied to global write buffer WQ0, read requests are processed in accordance with the arbitration process. The main memory data path is generally switched from a read to a write state when the global write buffer queue WQ0 is filled to a certain level or if a main processor read request matches an entry in the global write buffer. This switchover results in a flushing of the global write buffer WQ0 to write data to specified addresses of main memory 112.

As mentioned above, the dial registers control the memory bandwidth for the corresponding master. For example, if an accumulator to which the contents of command processor dial register are added every memory cycle is less than 1.00, even if there is a pending command processor request, the arbitration scheme grants memory access to another master until enough cycles elapse so that the contents of the accumulator is equals to or greater than 1.00, or until there is no pending request from any other masters. Memory controller 152 preferably does not permit the main memory 112 to be in an idle state because of dial register settings. The dial registers affect the arbitration scheme by masking requests from masters until the accumulator corresponding to the dial register of that master equals 1.00.

Thus, bandwidth dial registers influence the memory usage by some of the major memory "hogs". The read dials control the frequency with which the masters participate in the arbitration process and access memory. The write dials are for control flow and can slow down the writing device by throttling the writes into global write buffer WQ0. As noted, arbitration preferably does not allow the memory to be idle if there are outstanding read requests that not being allowed due to the settings of the bandwidth dials. In this case, a round robin scheme is used among the requesters that are being throttled.

In the example system, all reads are single cache-line (32 bytes). Thus, it takes two cycles of 200 MHz to read the cache line and a new read can be performed every 10 nanoseconds. Reads from main processor 110 have the highest priority, with round robin arbitration among the rest of the requestors. Memory ownership is changed every 10 nanoseconds among the read requesters and refresh, but the write queue is always written in its entirety. The write queue initiates a request when it is filled to or above a certain level or if a main processor read request matches an entry in the write-buffer.

As shown in FIG. 8, bandwidth dial registers and other registers identified specifically below are embodied in the memory controller's programmable memory registers 823. These registers, which are identified in detail below, are programmable by main CPU 110 to control a wide range of memory controller functions. Among the registers included in memory controller 152 are memory access performance related registers. For example, performance counter registers identify how many requests are received from particular competing resources. The performance counters are utilized to keep track of wasted memory cycles so that a determination may be made as to how effectively memory bandwidth has been allocated based upon an analysis of the performance counter registers. The performance counters may be utilized to differentiate between cycles which are necessarily lost in switching between read and write operations and idle time. As previously mentioned, cycles are wasted upon switching from a read to write, e.g., two idle cycles may result from such switching. The performance counters may be utilized to determine how well a particular application program is utilizing memory bandwidth by subtracting from performance statistics memory cycles which must necessarily be utilized for read/write switching and refresh operations. By monitoring such performance, application programmers are advantageously enabled to design more efficient programs that make better use of memory.

Turning back to FIG. 9, as stated above, each of the read queues RQ1 to RQ6, is resident in an associated interface in FIG. 8. Thus, read RQ1, as suggested by the signal line designation in FIG. 9 is resident in CP interface 200I. Similarly, write queue WQ1 (which in the illustrative embodiment queues eight requests) is resident only in PE interface 700I and is referred to herein as a "local" write queue buffer. Similarly, WQ2 through WQ4 are resident in the DSP IO and PI interfaces respectively and are local write queue buffers. WQ0 shown in FIG. 9 is the multiple resource or "global" write buffer and is resident in the FIG. 8 component wrbuf 827. The inputs to write buffer 827 shown in FIG. 8 correspond to the inputs to WQ0 shown in FIG. 9.

If, for example, multiple write requests are received in write buffer 827 at the same time, in accordance with an exemplary embodiment of the present invention, memory write buffer 827 may arbitrate among such write requests. Additionally, a dial register may be utilized in association with the global write buffer embodied in write buffer 827. In this fashion, a write request from PE or PI, through the use of a dial register, may be designated as a lower priority request by an application programmer. The global write buffer 827 is operatively coupled to the arbitration control 825 for arbitration of write requests.

With respect to processing read requests, in accordance with an illustrative embodiment, a round robin read is performed among resources based upon resource request arbitration processing in light of, for example, the dial register contents for each resource as explained above.

The following table lists illustrative sizes for each of the read and write queues shown in FIG. 9

| Queue | interface | depth | Width addr,data,mask | explanation |
|---|---|---|---|---|
| RQ1 | CP (read) | 16 | 21 | Match the max latency of a single access. |
| RQ2 | TC (read) | 16 | 21 | Match the max latency of a single access. |
| RQ3 | VI (read) | 1 | 21 | Single outstanding read request |
| RQ4 | DSP (read) | 1 | 21 | Single outstanding read request |
| RQ5 | IO (read) | 1 | 21 | Single outstanding read request |
| RQ6 | PI (read) | 6 | 23 | Multiple outstanding read request + skid 2 extra address bits to transfer critical oct-byte first. |
| WQ1 | PE (write) | 8 | 21 + 128 | Max transfer from WQ1 to WQ0 + skid |
| WQ2 | DSP (write) | 4 | 21 + 128 + 4 | Single outstanding write, no skid |
| WQ3 | IO (write) | 4 | 21 + 128 | Single outstanding write, no skid |
| WQ4 | PI (write) | 8 | 21 + 128 + 4 | Max transfer from WQ4 to WQ0 + skid |
| WQ0 | Global Write buffer | 16 | 24 + 128 + 4 | Deep enough to amortize memory data path read/write mode switch turn around . . . |

The FIG. 8 read requests from the respective read queues are directly coupled to arbitrator control 825 for arbitrating between received read requests. A request bus (which identifies whether a read from or write to main memory 112 is to take place at an associated address) is associated with each of the resources which are seeking access to main memory 112. Memory controller 152 queues up received memory access requests and sends the request result to the requesting resource.

In the case of write requests, flow control is accomplished in part using the local write buffers, e.g., WQ1 to WQ4, such that a signal is sent to the associated resource writing data to main memory 112 when the local write buffer is full (or nearly full) to inform the resource to stop sending data.

Memory controller 152 is advantageously designed to minimize read to write switching, since lost memory cycles result from such switching due to the need to place the bus in the proper read or write state. Memory controller 152 minimizes such read or write switching by gathering the required writes into a global write buffer WQ0 resident in wrbuf 827. While write requests are buffered, read requests are processed by arbitration control 825 from different resources. When the write buffer WQ0 begins to get full, it will arbitrate with the read requests in round robin fashion. Thereafter, multiple writes are processed at essentially the same time from global write buffer WQ0, which is filled from multiple resources, e.g., WQ1-WQ4. When the global write buffer WQ0 reaches a state where it is, for example, 75-80% full, memory controller 115 switches to a write state to initiate the flushing of the write buffer WQ0 to main memory 112 resulting in writing to the identified address locations.

Memory controller 152 utilizes three levels of write arbitration. The first level of arbitration occurs whereby write buffer control logic arbitrates with sources seeking to read information from memory. Another level of write arbitration occurs when the write buffers are not full. A third level of arbitration occurs when coherency processing is required, whereby write buffers are flushed to resolve the coherency issue.

FIG. 10 shows the read data path from main memory 112 to the identified resource via memory access controllers 804, 806, 808. Even though there are 6 read requestors, there are only 3 read data paths going back to the devices, the 128 bit GFX path, the 64 bit system path, and the 64 bit CPU path. The exemplary implementation does not use a unique data path for each device, since data is not transferred on all data paths at the same time. The exemplary implementation does not use a single 128-bit data path, since 64 bit devices, which take 4 cycles to receive data, are utilized. In-order to reduce the latency for CPU accesses, the CPU port was given its own path, and therefore two 64-bit paths and a 128-bit path have been utilized. The paths are connected as follows:

the GFX path, 128 bits @ 200 MHz is connected to CP 200 and TC 500. The bus bandwidth (BW) is equal to memory BW.

the CPU path, 64 bits @ 200 MHz is connected to the pi only. The bandwidth of this path is ½ of the bandwidth of memory 112.

the system bus, 64 bits @ 200 MHz is connected to IO, DSP and VI. All these devices are low BW and can only issue single outstanding transactions. The bus BW is ½ of memory BW.

The number and BW of these buses have direct impact on the memory arbitration. For example, GFX path can continuously request data from memory, whereas CPU can request data only every other cache-line cycle (100 mhz). And the same is true for system bus.

Data read from main memory 112 is sent back to a requesting resource in order. Accordingly, if a first request is followed by a second and other multiple outstanding requests, after arbitration of these requests, the requests are fulfilled in the order requested. Thus, data requested by requesting resource number 1 is routed followed by the data requested by requesting resource number 2, etc. Reads are expected by the CPU to be processed in order. The present design eliminates the need for hardware or software to perform reordering operations.

The memory controller advantageous is designed to efficiently respond to access requests in order to take full advantage of the main memory 112 use of a static RAM (SRAM) type of memory. As explained above, the example embodiment has a 1TSRAM that provides near static RAM type access in the context of a high density DRAM. The use of near SRAM access permits, for example, writing data to main memory 112 in the order desired because writing to one location in the SRAM takes the same time as writing to any other location no matter where in SRAM the data is to be stored. In contrast, when using DRAM, writes to memory must be scheduled in accordance with the memory refresh schedule to maximize speed preference. The use of an SRAM permits efficiently fulfilling requests in order at the price of having to maintain data coherency.

With respect to maintaining coherency (processor coherency in the preferred illustrative embodiment, since other resources may rely on flushes to guarantee read/write coherency), if a resource writes to an associated write buffer for thereafter writing data to main memory 112, and almost immediately thereafter an attempt is made to read such data from main memory 112, a coherency problem results due to the potential of reading stale data from main memory 112 instead of the updated data sought. The memory controller 152 addresses the coherency issue by ensuring that, for every read request, a check is made of the address to be read to ensure that such address does not appear in the write buffer. If the address is in the write buffer, then the write buffer needs to be flushed, i.e., copied to main memory, before the read operation is performed.

Certain of the resources such as, for example, the command processor CP 200 is a unidirectional resource such that it only performs read operations from main memory 112 and does not write to main memory 112. In the exemplary implementation, pixel engine PE only writes to main memory 112. Coherency issues particularly need to be addressed with CPU 110, since CPU 110 both reads and writes from and to main memory 112. Thus, with regard to CPU reads, the address to be read is compared to write buffer addresses and, as explained above, if the address is in the write buffer, the write buffer is flushed, and then the read operation is performed. For example, if writes are performed by a particular resource to locations 0, 1, and 2, which addresses are resident in a write buffer, and an attempt is made to read from location 0, since location 0 is in the write buffer, the system should flush the write buffer contents before reading from location 0. Accordingly, in order to ensure against coherency errors within a device, such errors will only occur if the resource has both read and write capability.

However, it is also desirable for the memory controller 152, to ensure against coherency errors among different resources. Thus, if pixel engine 700 receives a command to copy information to main memory 112, the local write buffer associated with pixel engine 700 will contain both the data to be copied and an address location at which to write to main memory 112. If, for example, the video interface 164 as the texture unit 500 thereafter seeks to read data from the same address to which the pixel engine 700 is writing data, the illustrative memory controller 152 synchronizes these operations. Thus, in accordance with an exemplary embodiment of the present invention, any device/resource that is writing to main memory 112 sends a flush signal to memory controller 152 which indicates to memory controller 152 to empty the respective resource's write buffer. Memory controller 152 generates a signal indicating that such operation has been completed to thereby inform CPU 110 to enable, for example, display unit 164 to read data from such a memory location.

The indication from memory controller 152 that data written to main memory 112 is actually stored in main memory 112 and not in a buffer gives any competing resource the opportunity to access such data. In accordance with this exemplary embodiment, coherency among devices is guaranteed by the device writing to memory by virtue of the receipt from memory controller 152 of a flush acknowledge handshake signal.

In accordance with an exemplary embodiment of the present invention, since writes are delayed, there are various types of coherency protocols which are performed, several of which have been briefly described above. Such coherency protocols, which are described and summarized below include:

Coherency between writes and reads from the same unit.
Coherency between writes and reads for CPU.
Coherency between writes by CPU and reads by CP in CP FIFO.
Coherency between writes and reads from two different units.

RW Coherency from the Same Unit

In the exemplary implementation, DSP, IO and PI can perform writes and reads. There is no hardware RW coherency for DSP or IO in accordance with an exemplary implementation. If each device needs to read back the data it wrote to main memory 112, it needs to explicitly flush the write-buffer. This is done by issuing a flush write buffer command and waiting for an acknowledge signal. The PI read requests on the other hand are checked against the write-buffer addresses. If there is a match, the write-buffer is flushed. Then the read will proceed. The write-buffer includes the individual write-buffer for the unit and the global write-buffer.

RW Coherency from CPU

In order to handle CPU 110 write and read coherency, bypassing logic and write buffer flushing mechanism is used. For a read request from CPU, the read address is sent immediately to main memory 112 and there's not enough time for RW coherency checking until one cycle later. If there's a match, since the read request has already been sent, the read data from the memory is aborted, then it will flush the write buffer, bypass and merge the write data and read data back to the CPU 110 at the end of the write buffer flush.

In the case that a read is followed by a write for the same address location, these two requests are dispatched into the read queue and write queue separately and memory controller 152 can not distinguish the order of these two requests. Therefore, read data may end up with the new write data instead of the original one as expected. CPU 110 configuration should be set accordingly to guarantee not to issue the write before the read data comes back.

RW Coherency Between Other Units.

In the exemplary implementation, there are 4 units that can write to memory: DSP, IO, PE and PI. Any time a device writes to memory, it needs to flush its write buffers explicitly, before signaling another device for reading the data. Each of these 4 interfaces has a 2-wire flush/acknowledge protocol to accomplish this. DSP, IO or PE will issue a flush at the end of a DMA write, before interrupting the CPU 110. This will guarantee that CPU 110 will access the desired data, upon read. CPU 110 also needs to perform an explicit flush when it sets up a buffer in main memory 112 and wants to initiate another device for a read DMA. Before starting the DMA, CPU 110 needs to perform a "sync" instruction. This instruction causes a sync bus cycle, which causes the memory controller 152 to flush the write buffer. Upon completion of the flush, the sync instruction is completed and CPU can start up a read DMA operation.

RW Coherency Between CPU/CP for CP FIFO

The memory controller also handles RW coherency between CPU writes and CP read for a command related buffer CP FIFO which is associated with external memory. PI will indicate whether the write request is for CP FIFO and memory controller will send CP the write request when the write data for CP FIFO has actually been committed to the main memory.

Turning back to FIG. 8, memory controller 152 includes a set of memory registers 823 through which the memory controller may be programmably controlled to perform a wide range of memory control and arbitration functions. In the exemplary implementation of the present invention, all registers are written through the processor interface 150. Although a table of a illustrative memory controller registers is set forth below, the following registers may be categorized into groups as follows.

Memory Protection/Interrupt Enable Registers

Four set of registers can be used for memory read, write or read/write protection by setting the read enable and/or write enable bits in MEM_MARR_CONTROL register shown in the illustrative register table below. For example, if a read address is within the range of MEM_MARR0_START and MEM_MARR0_END with MARR0 read disabled, it will set the MARR0 interrupt bit in MEM_INT_STAT register and MEM_INT_ADDRL, MEM_INT_ADDRH will have the read address that caused the interrupt. It can also cause an interrupt to the CPU if MARR0 interrupt enable bit is set in MEM_INT_ENBL register. Note that memory controller 152 is not going to terminate the read/write transaction to main memory 112 that causes the interrupt.

There is also an address interrupt that is generated if the request address is outside the current memory configuration range and within 64 Mbytes address space. If the request address is beyond 64 Mbytes, PI should generate the address interrupt and not send the request to memory controller.

Bandwidth Dial Registers

In the exemplary embodiment, there are dial registers for CP, TC, PE, CPU read and CPU write masters. These dial registers are used to lower the memory bandwidth for the associated master. For example, if the CP dial register contents when added to an associated accumulator is less than one, even if there's a pending CP request, the illustrative arbitration methodology will grant memory access to another master until CP dial register when added to the accumulator equals one or there's no other pending request from any other master. In other words, memory controller 152 never lets memory 112 be in an idle state because of the dial register settings. These dial registers indirectly affect the arbitration scheme by masking the request from that master if the dial register plus accumulator contents does not equal to 1.00. For further details, refer to the methodology described below and in more detail in the copending application Ser. No. 60/226,886 entitled "Method and Apparatus For Accessing Shared Resources", which has been incorporated herein by reference.

Performance Counter registers

There is a request counter per master except CPU, which has separate read and write request counters. These counters are mainly used for collecting statistics about memory usage and bandwidth for different masters. There are two additional counters: MEM_FI_REQCOUNT for counting number of idle cycles due to read/write bus turnaround overhead and MEM_RF_REQCOUNT for counting number of refresh cycles. All these counters will be clamped to max values when reached.

Data for Turnaround Registers

There are 3 registers used for setting number of idle cycles for the data path turnaround: one for RD to RD from a different memory bank, one for RD to WR switching and one for WR to RD switching.

Memory Refresh and Threshold Registers

When the number of clocks reached the refresh count in refresh counter, a refresh request will be generated. If the memory is idle, memory will be granted to refresh cycles. However, if memory is non-idle, it will be granted only if the total number of refresh requests reaches the threshold value set in the memory refresh threshold register.

For purposes of illustrating an exemplary memory controller 152 register set, the following table shows example memory controller 152 registers.

| Register address | Register name | Field | description |
| --- | --- | --- | --- |
| 0x0 (r, w) | MEM_MARR0_START | [15:0] | Starting address of memory address range register 0 memory address (25:10) |
| 0x2 (r, w) | MEM_MARR0_END | [15:0] | Ending address of memory address range register 0 memory address (25:10) |
| 0x4 (r, w) | MEM_MARR1_START | [15:0] | Starting address of memory address range register 1 memory address (25:10) |
| 0x6 (r, w) | MEM_MARR1_END | [15:0] | Ending address of memory address range register 1 memory address (25:10) |
| 0x8 (r, w) | MEM_MARR2_START | [15:0] | Starting address of memory address range register 2 memory address (25:10) |
| 0xa (r, w) | MEM_MARR2_END | [15:0] | Ending address of memory address range register 2 memory address (25:10) |
| 0xc (r, w) | MEM_MARR3_START | [15:0] | Starting address of memory address range register 3 memory address (25:10) |
| 0xe (r, w) | MEM_MARR3_END | [15:0] | Ending address of memory address range register 3 memory address (25:10) |
| 0x10 (r, w) | MEM_MARR_CONTROL | [7:0] | Control register for the MAR registers 3 to 0<br>0: MARR0 read enable (OK to read between MARR0_START and MARR0_END)<br>ie MARR0_START <= Address < MARR0_END<br>1: MARR0 write enable(OK to write between MARR0_START |

-continued

| Register address | Register name | Field | description |
|---|---|---|---|
| | | | and MARR0_END) ie MARR0_START <= Address < MARR0_END 2: MARR1 read enable 3: MARR1 write enable 4: MARR2 read enable 5: MARR2 write enable 6: MARR3 read enable 7: MARR3 write enable Default value: 0xff (okay to write or read) |
| 0x12 (w) | MEM_CP_BW_DIAL | [8:0] | Format is 1.8. Every cycle this number is added to an accumulator that is initialized to 0. When bit 8, is set, then CP request is enabled and CP is allowed in arbitration. When set to 0x1.00, CP request is always enabled Default value: 0x1.00 |
| 0x14 (w) | MEM_TC_BW_DIAL | [8:0] | Format is 1.8. Every cycle this number is added to an accumulator that is initialized to 0. When bit 8, is set, then TC request is enabled and TC is allowed in arbitration. When set to 0x1.00, TC request is always enabled Default value: 0x1.00 |
| 0x16 (w) | MEM_PE_BW_DIAL | [8:0] | Format is 1.8. Every cycle this number is added to an accumulator that is initialized to 0. When bit 8, is set, then PE write request is enabled and PE write can be transferred from the first queue to the WQ0. When set to 0x1.00, PE write is always enabled Default value: 0x1.00 |
| 0x18 (w) | MEM_CPUR_BW_DIAL | [8:0] | Format is 1.8. Every cycle this number is added to an accumulator that is initialized to 0. When bit 8, is set, then CPU request is enabled and CPU read is allowed in arbitration. When set to 0x1.00, CPU read request is always enabled Default value: 0x1.00 |
| 0x1a (w) | MEM_CPUW_BW_DIAL | [8:0] | Format is 1.8. Every cycle this number is added to an accumulator that is initialized to 0. When bit 8, is set, then CPU write data is written into the write-buffer. When set to 0x1.00, CPU write data is accepted immediately Default value: 0x1.00 |
| 0x1c (r, w) | MEM_INT_ENBL | [4:0] | Interrupt enable register for MARRs and address out of range error 0: MARR0 interrupt enable 0 for disabled, 1: enabled 1: MARR1 interrupt enable 2: MARR2 interrupt enable 3: MARR3 interrupt enable 4: Address Error interrupt enable Default value: 0x00 (disable) |
| 0x1e (r) | MEM_INT_STAT | [4:0] | Interrupt status register 0: MARR0 interrupt 1: MARR1 interrupt 2: MARR2 interrupt 3: MARR3 interrupt 4: Address Error interrupt Reset value: 0x00 |
| 0x20 (w) | MEM_INT_CLR | | Interrupt clear. Writing to register clears all interrupts. |
| 0x22 (r) | MEM_INT_ADDRL | [15:0] | Bits 15:0 of the memory address that caused the interrupt. |
| 0x24 (r) | MEM_INT_ADDRH | [9:0] | Bits 25:16 of the memory address that caused the interrupt. |
| 0x26 (r, w) | MEM_REFRESH | [7:0] | Number of cycles between memory refresh Default value: 0x80 (128 cycles) If it is zero, it is a special case for not generating any refresh cycles. This must be used with mem_refresh_thhdA to have a minimum value of 1. |
| 0x2c (r, w) | MEM_RDTORD | [0] | For back to back read in the memory development system: 0: One idle cycle asserted when switching between the two. 1: Two idle cycles asserted when switching between the two. Default value: 0 |
| 0x2e (r, w) | MEM_RDTOWR | [0] | For a read followed by a write: 0: Two idle cycles asserted for turn around. 1: Three idle cycles asserted for turn around. Default value: 0 |
| 0x30 (r, w) | MEM_WRTORD | [0] | For a write followed by a read: 0: No idle cycle asserted. 1: One idle cycle asserted. Default value: 0 |
| 0x32(r, w) | MEM_CP_REQCOUNTH | [15:0] | Upper 16 bits of the 32 bits counter for CP memory requests processed (31:16). Write 0 to clear counter. |
| 0x34(r, w) | MEM_CP_REQCOUNTL | [15:0] | Lower 16 bits of the 32 bits counter for CP memory requests processed (15:0). Write 0 to clear counter. |
| 0x36(r, w) | MEM_TC_REQCOUNTH | [15:0] | Upper 16 bits of the 32 bits counter for TC memory requests processed (31:16). Write 0 to clear counter. |

-continued

| Register address | Register name | Field | description |
|---|---|---|---|
| 0x38(r, w) | MEM_TC_REQCOUNTL | [15:0] | Lower 16 bits of the 32 bits counter for TC memory requests processed (15:0). Write 0 to clear counter. |
| 0x3a(r, w) | MEM_CPUR_REQCOUNTH | [15:0] | Upper 16 bits of the 32 bits counter for CPU read requests processed (31:16). Write 0 to clear counter |
| 0x3c(r, w) | MEM_CPUR_REQCOUNTL | [15:0] | Lower 16 bits of the 32 bits counter for CPU read requests processed (15:0). Write 0 to clear counter |
| 0x3e(r, w) | MEM_CPUW_REQCOUNTH | [15:0] | Upper 16 bits of the 32 bits counter for CPU write requests processed (31:16). Write 0 to clear counter. |
| 0x40(r, w) | MEM_CPUW_REQCOUNTL | [15:0] | Lower 16 bits of the 32 bits counter for CPU write requests processed (15:0). Write 0 to clear counter. |
| 0x42(r, w) | MEM_DSP_REQCOUNTH | [15:0] | Upper 16 bits of the 32 bits counter for DSP write/read requests processed (31:16). Write 0 to clear counter. |
| 0x44(r, w) | MEM_DSP_REQCOUNTL | [15:0] | Lower 16 bits of the 32 bits counter for DSP write/read requests processed (15:0). Write 0 to clear counter. |
| 0x46(r, w) | MEM_IO_REQCOUNTH | [15:0] | Upper 16 bits of the 32 bits counter for IO write/read requests processed (31:16). Write 0 to clear counter. |
| 0x48(r, w) | MEM_IO_REQCOUNTL | [15:0] | Lower 16 bits of the 32 bits counter for IO write/read requests processed (15:0). Write 0 to clear counter. |
| 0x4a(r, w) | MEM_VI_REQCOUNTH | [15:0] | Upper 16 bits of the 32 bits counter for VI memory requests processed (31:16). Write 0 to clear counter. |
| 0x4c(r, w) | MEM_VI_REQCOUNTL | [15:0] | Lower 16 bits of the 32 bits counter for VI memory requests processed (15:0). Write 0 to clear counter. |
| 0x4e(r ,w) | MEM_PE_REQCOUNTH | [15:0] | Upper 16 bits of the 32 bits counter for PE memory requests processed (31:16). Write 0 to clear counter. |
| 0x50(r ,w) | MEM_PE_REQCOUNTL | [15:0] | Lower 16 bits of the 32 bits counter for PE memory requests processed (15:0). Write 0 to clear counter. |
| 0x52(r, w) | MEM_RF_REQCOUNTH | [15:0] | Upper 16 bits of the 32 bits counter for memory refresh requests processed (31:16). Write 0 to clear counter. |
| 0x54(r, w) | MEM_RF_REQCOUNTL | [15:0] | Lower 16 bits of the 32 bits counter for memory refresh requests processed (15:0). Write 0 to clear counter. |
| 0x56(r, w) | MEM_FI_REQCOUNTH | [15:0] | Upper 16 bits of the 33 bits counter for memory forced idle requests processed (32:17). Write 0 to clear counter. Increment by one every idle cycle. |
| 0x58(r, w) | MEM_FI_REQCOUNTL | [15:0] | Lower 16 bits of the 33 bits counter for memory forced idle requests processed (16:1). Write 0 to clear counter. Increment by one every idle cycle. |
| 0x5a (r, w) | MEM_DRV_STRENGTH | [10:0] | Drive Strength |
| 0x5c (r, w) | MEM_REFRSH_THHD | [2:0] | Threshold for generating the refresh request when the total. number of outstanding refresh requests exists. Default value: 0x2 In order to generate zero refresh cycles, this register must be set to be non-zero together with mem_refresh set to 0x0. |

Turning back to the FIG. 8 memory controller block diagram, as set forth above, memory controller 152 includes arbitration control 825 which operates to arbitrate memory access requests between the competing resources identified above. For further details regarding the arbitration control, reference should be made to copending application Ser. No. 60/226,886, entitled "Method and Apparatus For Accessing Shared Resources", which has been incorporated herein by reference. All reads are single cache-line (32 bytes). It takes 2 cycles of 200 Mhz to read the cache-line. Thus a new read can be performed every 10 nsec. CPU reads will have the highest priority, with round robin arbitration among the rest of the requesters. Memory ownership is changed every 10 nsec among the read requestors and refresh, but the write queue is always written in its entirety. Write queue initiates a request when it gets above a certain level or if a CPU read request address matches an entry in the write-buffer. In accordance with the illustrative embodiment, there are the following restrictions as to the frequency of requests:

Two CPU reads can not occur back to back

Two System reads can not occur back to back.

During a 10-nsec refresh cycle, 2 rows are refreshed. One every 5 nsec.

BW Dials

As described above, BW dials are provided via the BW registers referenced above to influence the memory usage by some of the major memory users. There are dials for the following devices:

CPU read
CP read
TC read
CPU write
PE write

The read dials control the frequency of the units to participate in arbitration and access memory. The write dials are for control flow and can slow down the writing device by throttling the writes into the main write buffer.

The arbitration methodology will not allow the memory 112 to be idle if there are outstanding read requests that are not being allowed due to the BW dial. In this case a round robin scheme is used among the requestors that are being throttled.

Read Queues Arbitration

CPU read has the highest priority except the following conditions:

CPU was the master for the previous access

CPU read dial knob does not equal to 1.00 and there are other requests by other masters with dial knob equals 1.00

Write Buffer is completely full and it is in the middle of the write cycles

Previous CPU read address matches a valid CPU write address in the PI local write buffer or global write buffer which will cause a write buffer flush CP (or TC) read has the same priority as any other system masters (DSP, IO and VI) and hence arbitrates the memory in the round robin fashion with the system masters except the following conditions:

DSP, IO or VI was the master for the previous access which then cannot arbitrate again, CP (or TC) read dial knob does not equal to 1.00 and there are other requests by other masters with dial knob equals to 1.00, it will then have a lowest priority DSP (or IO or VI) read has the same priority as any other GFX masters (CP and TC) and hence arbitrates the memory in the round robin fashion with the GFX masters except the following conditions:

DSP (or IO or VI) was the master for the previous access which then cannot arbitrate again.

Write Buffer has lower priority then CPU, GFX or system masters except the following conditions:

Write Buffer is completely full and it will arbitrate with others in the round-robin fashion CPU read address matches a write address in write buffer and it will have the highest priority Any other masters with higher priority have the dial knob less than 1.00

Refresh has the lowest priority except the following conditions:

Number of total refresh requests reaches the threshold value, its priority will be bumped up to just below CPU read.

Any other masters with higher priority have the dial knob less than 1.00

Write Queues Arbitration

CPU, PE, DSP and IO are the four masters in the write queue. CPU writes has the highest priority and the other three masters arbitrate in the round-robin fashion except the following condition:

CPU write dial knob does not equal to 1.00 and there are other write masters with dial knob equals to 1.00

All these together will form the write buffer queue arbitrating the memory bandwidth with the read masters.

Figure 11:
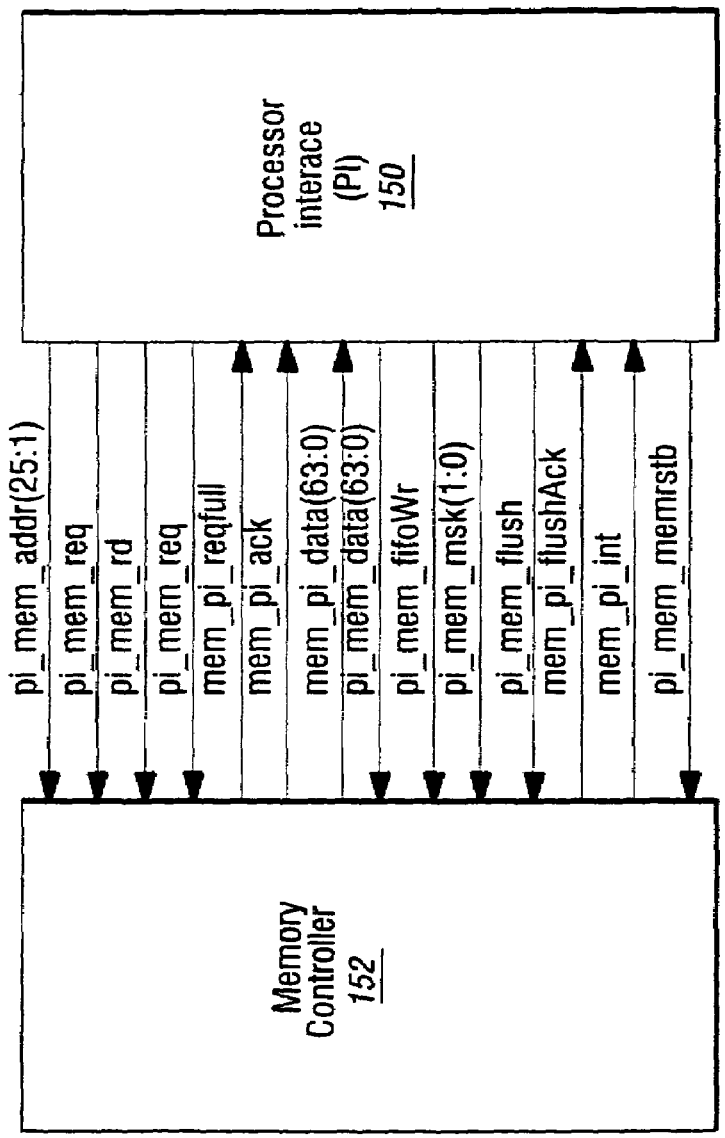
FIG. 11 is a block diagram showing an exemplary set of communication signals exchanged between the memory controller and the processor interface (PI)

Each of the interfaces depicted in FIG. 6A with memory controller 152 will now be described in further detail. FIG. 11 is a block diagram showing an exemplary set of communication signals exchanged between memory controller 152 and processor interface (PI) 150. The interface shown in FIG. 11 allows reads and writes to main memory 112 from CPU 110.

This interface supports multiple outstanding read requests. In the illustrative embodiment, a new read request can be issued every cycle and a new write request can be issued every 4 clocks (4 cycles to transfer the cache-line on the bus). The memory controller 152 performs flow control by asserting mem_pi_reqfull. Write data are not acknowledged. Read data are acknowledged with the transfer of the first oct-byte of the cache. If the request address is not 32B aligned, critical double word will be returned first. All read data are processed in-order. Write data are buffered and delayed to increase memory efficiency. pi_mem_flush is asserted for one cycle to flush the write buffer. mem_pi_flush_ack is issued for one cycle to signal that the write buffer is flushed.

All interface control signals should be registered to any avoid timing problem due to long wire. For example, memory controller 152 should register the pi_mem_req signal first, and the generated mem_pi_ack signal should also be registered on both the memory controller 152 side and the Module 150 side.

However, due to the memory bandwidth and CPU performance reasons, pi_mem_addr will not be registered and will be sent immediately to the main memory, this will reduce one cycle of latency.

The signals exchanged in the illustrative embodiment between the memory controller 152 and the processor interface 150 are shown in the table below.

| signal | description |
|---|---|
| pi_mem_addr[25:1] | Address of cache-line for read/write. Read is always double word aligned (critical double word first). Write is always 32 byte aligned. For main memory read, pi_mem_addr[25:3] will be used. For main memory write, pi_mem_addr[25:5] will be used. For memory register read/write, pi_mem_addr[8:1] will be used. |
| pi_mem_req | Asserted for one cycle to issue a cache-line read/write request. pi_mem_addr, pi_mem_fifoWr and pi_mem_rd are valid for that cycle. For a write request, the first Oct-byte of the data is also valid on the pi_mem_data bus in this cycle. |
| pi_mem_rd | 0 is write; 1 is read |
| pi_mem_reg | 0: memory access; 1: register access During register writes the lower 8 bits of the address holds the register address and pi_mem_data[63:48] hold the register value. |
| pi_mem_fifoWr | 1: Memory writes for CP FIFO, valid only during pi_mem_req cycle. |
| mem_pi_regfull | When this signal is asserted to 1, two more read and writes requests can be issued. |
| mem_pi_ack | Asserted for one cycle to signal return of data from memory during read. Bytes 0 to 7 of the cache-line are sent in that cycle. Bytes 8-15, 16-23 and 24-31 are sent in the following cycles on the mem_pi_data bus. If the read address is not 32B aligned, critical double word will be returned first. No acknowledge signal will be asserted for memory writes. All read requests are processed in-order. |
| mem_pi_data[63:0] | 8 byte bus to transfer data from memory. A cache-line is transferred on this bus in 4 back-to-back clocks. Critical double word will come first. |
| pi_mem_data[63:0] | 8 byte bus to transfer data to memory. A cache-line is transferred on this bus in 4 back-to-back clocks. The pi_mem_msk[1:0] bits determine validity of the two 32-bit words. |
| pi_mem_msk[1:0] | 32-bit word write mask bits for pi_mem_data [63:0]. pi_mem_msk[1] is write mask for pi_mem_data[63:32]. pi_mem_msk[0] is write mask for pi_mem_data[31:0]. Mask equals 0 for write enable. |
| pi_mem_flush | Asserted b the PI for one cycle to flush the write buffer in memory controller . . . |
| mem_pi_flush_ack | Asserted by mem for one cycle, when the write buffer is flushed. |
| mem_pi_int | Interrupt from mem to pi. |
| pi_mem_memrstb | Pi_mem_memrstb caused by power-on-reset or software-reset. Disabled by software writing to memrstb register in PI. |

Turning next to the audio DSP 156/memory controller interface 152, the following table illustrates exemplary signals exchanged between these two components together with a signal description.

Error! Not a valid filename.

Turning next to the input-output interface 802/memory controller interface 152, the following table illustrates exemplary signals exchanged.

| Signal name | description |
|---|---|
| io_memAddr[25:5] | Address of cache-line for read/write. Bits (4:0) are 0 and are not transmitted. |
| io_memReq | Asserted for one cycle to issue a cache-line read/write request. io_memAddr is valid for that cycle. |
| io_memRd | 0 is write; 1 is read |
| mem_ioAck | Asserted for one cycle to signal return of data from memory during read. Bytes 7 to 0 of the cache-line are sent in that cycle. Bytes 15-8, 23-16 and 31-24 are sent in the following cycles on the mem_ioData bus. |
| mem_ioData[63:0] | 8 byte bus to transfer data from memory. A cache-line is transferred on this bus in 4 back-to-back clocks. |
| io_memData[63:0] | 8 byte bus to transfer data to memory. A cache-line is transferred on this bus in 4 back-to-back clocks. |
| io_memFlushWrBuf | At the end of a write burst. This signal is asserted for one cycle, and causes the memory controller to flush the write buffer. |
| mem_ioFlushWrAck | This signal is asserted for one cycle when the memory controller has completed flushing the write buffer in response to the assertion of io_memFlushWrBuf. |

With respect to the I/O interface 802/memory controller 152 signals, at most one outstanding transfer is permitted in the exemplary embodiment, i.e., the next transfer cannot start until the previous transfer completes (with mem_ioAck signal). There are at least two levels of write buffering on the memory controller side to buffer the write data. That is, the interface should be able to buffer the write data from the Module 802 and delay issuing the acknowledge signal if the buffer is full.

Figure 12:
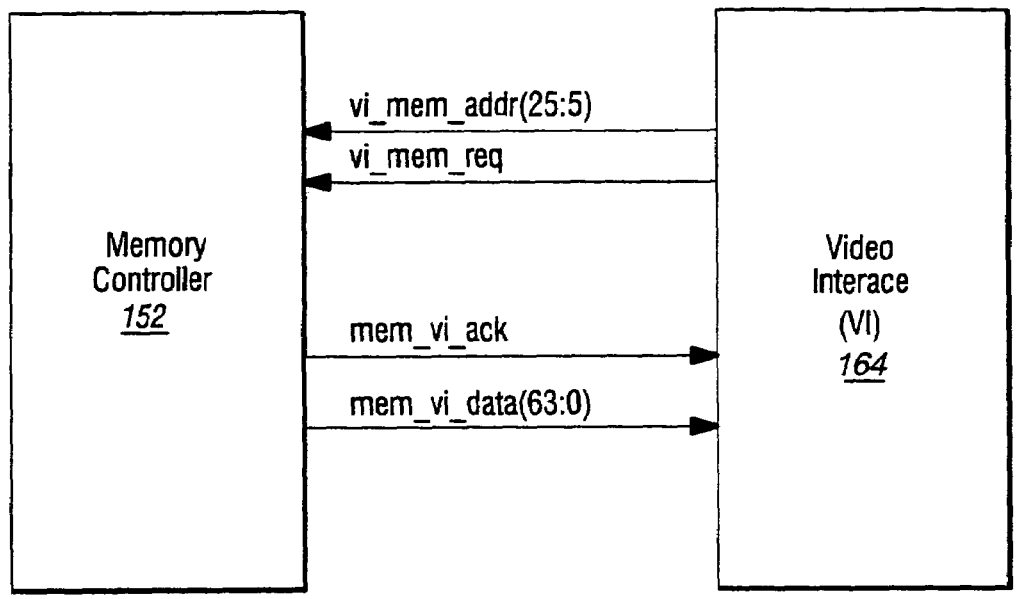
FIG. 12 is a block diagram showing an exemplary set of communication signals exchanged between the memory controller and video interface.

FIG. 12 is a block diagram showing an exemplary set of communication signals exchanged between memory controller 152 and video interface 164. The interface signals are described in the table below.

Figure 13:
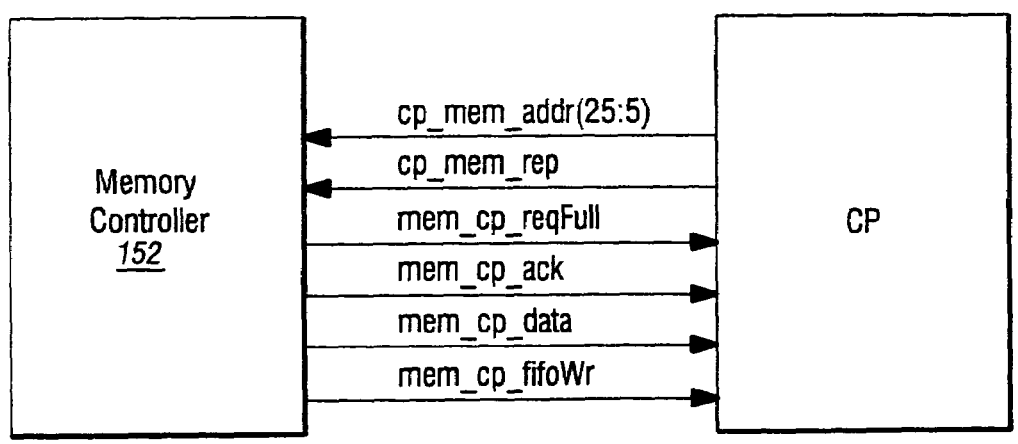
FIG. 13 is a block diagram showing an exemplary set of communication signals exchanged between the memory controller and cache/command processor.

Error! Not a valid filename. FIG. 13 is a block diagram showing an exemplary set of communication signals exchanged between memory controller 152 and cache/command processor 200. The table below illustrates exemplary signals exchanged. between these components.

| Name: | Description |
|---|---|
| cp_mem_addr(25:5) | Address of cache-line for read. Bits (4:0) are 0 and are not transmitted. |
| cp_mem_req | Asserted for one cycle to issue a cache-line read request. cp_mem_addr is valid for that cycle. |
| mem_cp_reqFull | When asserted, the read request queue is almost full. Only 2 more requests can be sent. |
| mem_cp_ack | Asserted for one cycle to signal return of data from memory. Bytes 15 to 0 of the cache-line are sent in the next cycle. Bytes 31-16 are sent after two cycles. |
| mem_cp_fifoWr | Asserted for one cycle indicating a new data has been written to CP FIFO in the main memory by the CPU for CP to access. |
| mem_cp_data(127:0) | 16 byte bus to transfer data from memory. A cache-line is transferred on this bus in 2 back-to-back clocks. |

Figure 14:
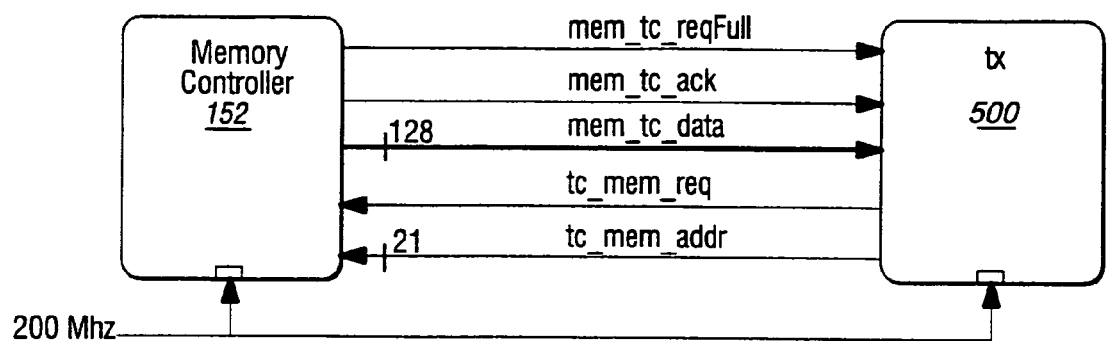
FIG. 14 is a block diagram showing an exemplary set of communication signals exchanged between the memory controller and the texture unit 500.

FIG. 14 is a block diagram showing an exemplary set of communication signals exchanged between memory controller 152 and the texture unit 500. The table below illustrates exemplary signals exchanged between these components.

Error! Not a valid filename.

Figure 15:
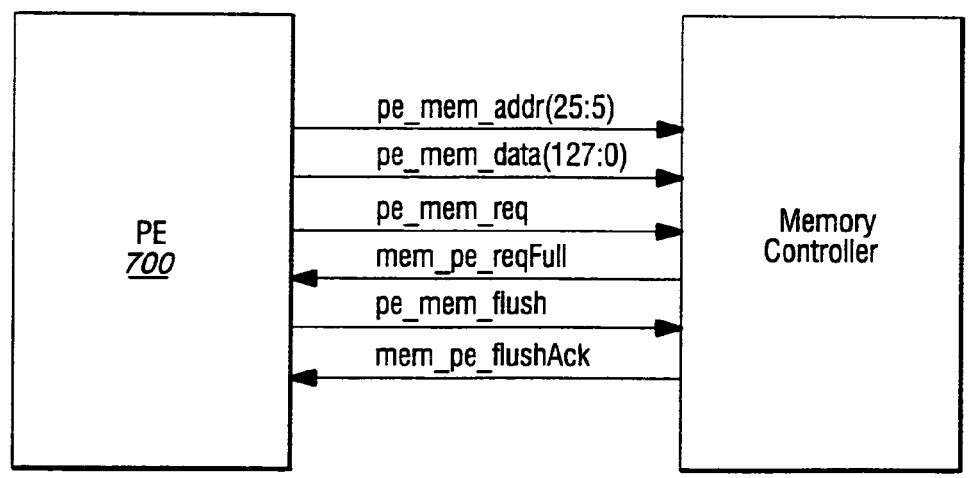
FIG. 15 is a block diagram showing an exemplary set of communication signals exchanged between the memory controller and the pixel engine (PE) 700.

FIG. 15 is a block diagram showing an exemplary set of communication signals exchanged between memory controller 152 and the pixel engine (PE) 700. It is used to transfer filtered frame buffer images to main memory for display. It also converts frame buffer format to texture format and writes it into main memory 112. The table below illustrates exemplary signals exchanged between these components.

| Name: | Description |
|---|---|
| pe_mem_addr(25:5) | Address of the cache-line for write, bit 4 to bit 0 are always zero. |
| pe_mem_req | Asserted for one cycle to issue a cache-line write request. pe_mem_addr is valid for that cycle. The first ½ of the cache-line is on the data bus in this cycle. |
| pe_mem_data(127:0) | Data bus. The first ½ of the cache-line is transferred when pe_mem_req is asserted. The second ½ will be transferred in the next cycle. The 2½ cache-lines are always transferred in back to back cycles |
| pe_mem_flush | At the end of a write burst. This signal is asserted for one cycle, so that the memory controller will flush the write buffer. |
| mem_pe_flushAck | Memory controller will asserted this signal for one cycle after receiving pe_mem_flush and flushing the write buffer. |
| mem_pe_reqFull | When asserted, the write queue is almost full. If the signal is asserted in the same cycle as request, no more requests will come until the signal is de-asserted. When the signal is asserted in the cycle after request, one more request can be issued. |

The memory controller 152 sends address and control signals directly to external memory. Among the control signals shown are the control signals for switching the bus between a read to a write state. The following table illustrates exemplary signals exchanged. between these components. Included among the signals are the read/write signals which are needed to switch the bidirectional memory bus from a read to write state.

| Name | Direction | Bits | Description |
|---|---|---|---|
| Mema_topad | ○ | 22 | Memory address, bit 0 is always zero |
| Memrw_topad | ○ | 1 | 0: Write 1: Read |
| Memadsb_topad | ○ | 2 | Bit 1 selects development memory, bit 0 selects main memory, active low |
| Memrfsh_topad | ○ | 1 | Refresh cycle |
| memdrvctl_topad | ○ | 3 | Drive strength control for address pads |
| memateb_topad | ○ | 1 | Active Terminator Enable, active low |

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 16A:
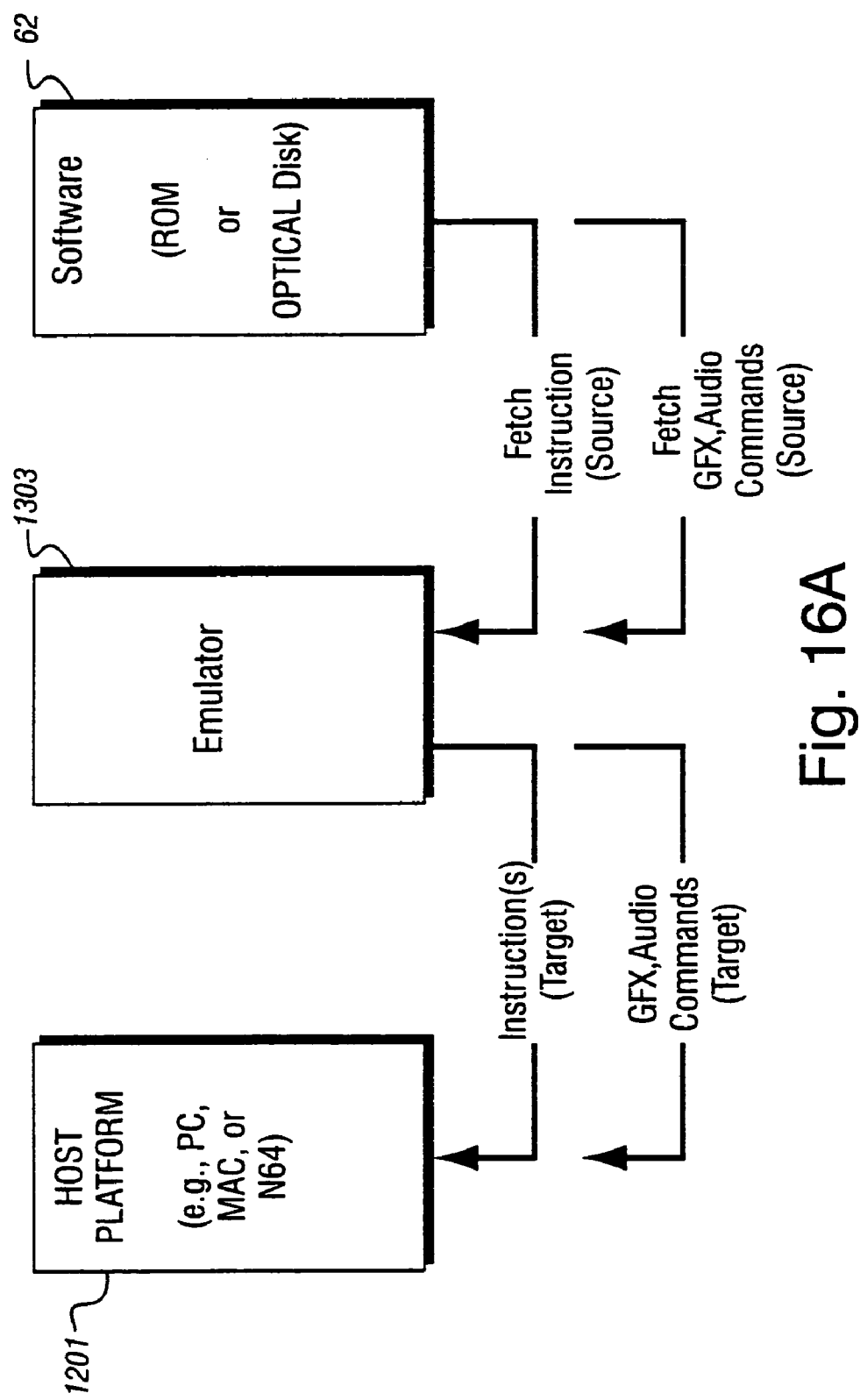
FIGS. 16A and 16B show example alternative compatible implementations.

FIG. 16A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 16B:
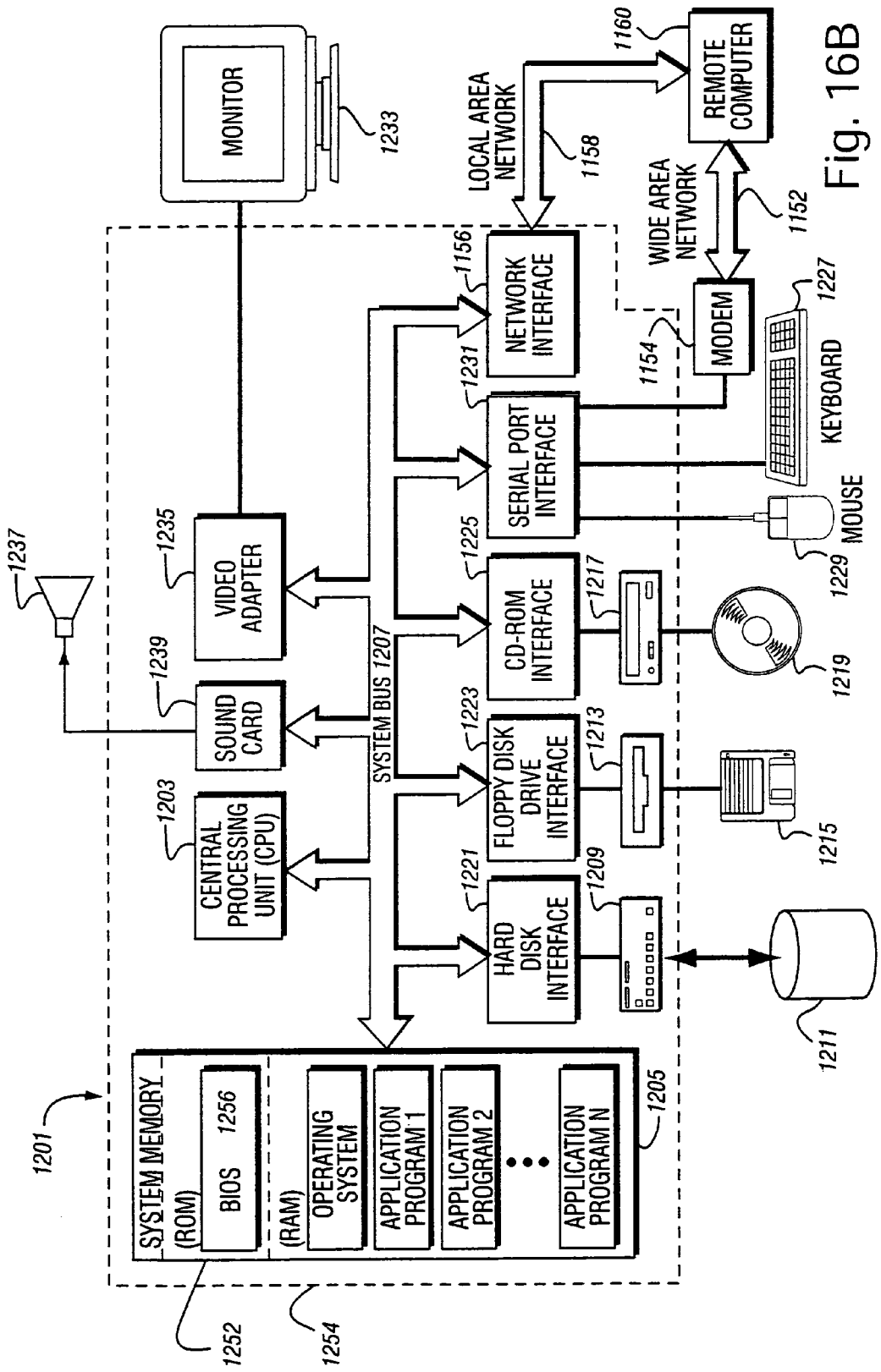

FIG. 16B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 120I, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 121I, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. In a graphics system including a main processor and a graphics processing system for generating graphics images on a display in cooperation with said main processor, and a main memory, said system including a plurality of resources requesting access to said main memory, a memory controller comprising:
    a plurality of buffer memories, each of said buffer memories being operatively coupled to one of said plurality of resources requesting access to said main memory for storing information indicative of a request for main memory access;
    a multiple resource buffer memory coupled to said plurality of buffer memories for storing requests for main memory access from each of said plurality of resources; and
    a control circuit for controlling the transfer of information from said plurality of buffer memories to said multiple resource buffer memory, wherein said control circuit is operable to control the transfer of information from said plurality of buffer memories to said multiple resource buffer memory to reduce the frequency of switching from main memory write operations to main memory read operations,
    wherein said plurality of buffer memories and said multiple resource buffer memory are write request queues,
    wherein a resource that is writing to main memory generates a flush signal for initiating flushing of that resource's write request queue, and
    wherein said memory controller further includes a flush acknowledge handshake signal generating circuit that generates a flush acknowledge handshake signal to thereby indicate to competing resources that data written to main memory is actually stored in main memory rather than in an associated resource's buffer.

2. A memory controller according to claim 1, wherein said control circuit is operable to control the rate at which write requests are coupled to the multiple resource buffer memory from the plurality of buffer memories.

3. A memory controller according to claim 1, further including a plurality of main memory read queues, each read queue being operatively coupled to a resource requesting to read information from said main memory.

4. A memory controller according to claim 1, wherein said control circuit includes arbitration circuitry for arbitrating requests for access to said main memory.

5. A memory controller according to claim 4, wherein said arbitration circuitry is operable to control the frequency with which the requesting resources are enabled to participate in the arbitrating for main memory access.

6. A memory controller according to claim 1, further including a memory access control register associated with one of said resources, wherein said control circuit includes arbitration circuitry responsive to the contents of said memory access control register for determining the frequency that said resource is permitted to participate in the arbitrating for main memory access.

7. A memory controller according to claim 1, further including a set of control registers, said control registers being programmable by said main processor.

8. A memory controller according to claim 7, wherein said control circuitry is operable to arbitrate between said resources for granting requests for main memory access, wherein said control registers include a plurality of memory bandwidth control registers which are accessed by said control circuitry in determining which resource will be granted main memory access.

9. A memory controller according to claim 8, wherein each of said memory bandwidth control registers is respectively associated with a resource seeking main memory access.

10. A memory controller according to claim 7, wherein said control registers include at least one register associated with a main memory access requesting resource for storing data for said requesting resource indicative of at least one of memory usage and memory bandwidth for that resource.

11. In a graphics system including a main processor and a graphics processing system for generating graphics images on a display in cooperation with said main processor, and a main memory, said system including a plurality of resources requesting access to said main memory, a memory controller comprising:
    a plurality of buffer memories, each of said buffer memories being operatively coupled to one of said plurality of resources requesting access to said main memory for storing information indicative of a request for main memory access;
    a multiple resource buffer memory coupled to said plurality of buffer memories for storing requests for main memory access from each of said plurality of resources; and
    a control circuit for controlling the transfer of information from said plurality of buffer memories to said multiple resource buffer memory, wherein said control circuit is operable to control the transfer of information from said plurality of buffer memories to said multiple resource buffer memory to reduce the frequency of switching from main memory write operations to main memory read operations; and
    at least one register associated with a main memory access requesting resource for storing data for said requesting resource indicative of wasted memory cycles due to granting main memory access to that resource.

12. In an information processing system including a main processor, a main memory, and at least a first and a second resource competing with said main processor for access to said main memory, a memory controller comprising:
    a main processor related interface including a main processor read request queue and a main processor write request queue;
    a first resource related interface including at least one of a first resource read request queue and a first resource write request queue;
    a second resource related interface including at least one of a second resource read request queue and a second resource write request queue;
    a multiple resource write request queue for receiving requests for writing to said main memory; and a memory access control circuit for granting access to said main memory, said memory access control circuit being coupled to receive read requests from each of said read request queues and for receiving write requests from said multiple resource write request queues wherein a resource that is writing to main memory generates a flush signal for initiating flushing of that resource's write request queue, and wherein said memory controller further includes a flush acknowledge handshake signal generating circuit to generate a flush acknowledge handshake signal and thereby indicate to competing resources that data written to main memory is actually stored in main memory rather than in an associated resource buffer.

13. A memory controller according to claim 12, wherein said memory access control circuit is operable to control the transfer of information from said main processor write request queue, said first resource write request queue and said second resource write request queue to said multiple resource write request queue to thereby reduce the frequency of switching from main memory write operations to main memory read operations.

14. A memory controller according to claim 12, wherein said memory access control circuitry is operable to arbitrate among resources competing for memory access to said main memory and to control the frequency with which requesting resources are enabled to participate in the arbitration.

15. A memory controller according to claim 12, further including a memory access control register associated with one of said resources, wherein said memory access control circuit includes arbitration circuitry responsive to the contents of said memory access control register for determining the frequency that said resource is permitted to participate in main memory access arbitration.

16. A memory controller according to claim 12, further including a set of control registers, said control registers being programmable by said main processor.

17. A memory controller according to claim 16, wherein said memory access control circuit is operable to arbitrate between said resources for granting requests for access to said main memory, wherein said control registers include a plurality of memory bandwidth control registers which are accessed by said memory access control circuit in determining which resource will be granted main memory access.

18. A memory controller according to claim 17, wherein each of said memory bandwidth control registers is respectively associated with a resource requesting main memory access.

19. A memory controller according to claim 16, wherein said control registers include at least one performance related register associated with a main memory access requesting resource for storing data for said requesting resource indicative of at least one of memory usage and memory bandwidth for that resource.

20. In an information processing system including a main processor, a main memory, and at least a first and a second resource competing with said main processor for access to said main memory, a memory controller comprising:
 a main processor related interface including a main processor read request queue and a main processor write request queue;
 a first resource related interface including at least one of a first resource read request queue and a first resource write request queue;
 a second resource related interface including at least one of a second resource read request queue and a second resource write request queue;
 a multiple resource write request queue for receiving requests for writing to said main memory:
 a memory access control circuit for granting access to said main memory, said memory access control circuit being coupled to receive read requests from each of said read request queues and for receiving write requests from said multiple resource write request queue; and
 at least one performance related register associated with a main memory access requesting resource for storing data for said requesting resource indicative of wasted memory cycles due to granting main memory access to that resource.

21. In an information system including a main processor, a main memory, and at least a first and a second resource competing with said main processor for access to said main memory, a method of controlling access to said main memory comprising the steps of:
 storing requests for main memory access from a first resource in a first resource request queue;
 storing requests for main memory access from a second resource in a second resource request queue;
 delaying forwarding requests for main memory access to a memory access control circuit to reduce the frequency of switching between memory read states and memory write states;
 granting requests for main memory access by said memory access control circuit;
 writing data by a resource to main memory:
 generating a buffer flush signal for initiating flushing of that resource's write request queue; and generating a flush acknowledge handshake signal to competing resources that data written to main memory is actually stored in main memory rather than in an associated resource's buffer.

22. A method according to claim 21, wherein said step of delaying includes the step of storing requests in a multiple resource write queue.

23. A method according to claim 21, further including the step of storing requests for main memory access by said main processor in a main processor request queue.

24. A method according to claim 21, wherein said step of granting requests for main memory access includes the step of arbitrating among competing resources and further including the step of controlling the frequency with which requesting resources are enabled to participate in main memory access arbitration.

25. A method according to claim 24, wherein the step of controlling the frequency includes the step of accessing contents of a memory access control register associated with a resource for determining the frequency that said resource is permitted to participate in main memory access arbitration.

26. A method according to claim 21, further including the step of controlling main memory access by programming at least one of a set of control registers in said memory controller by said main processor.

27. A method according to claim 21, wherein said step of granting main memory access includes the step of arbitrating between said resources for granting requests for main memory access, and further including the step of accessing a plurality of memory bandwidth control registers and determining which resource will be granted main memory access in part based upon the contents of said memory bandwidth control registers.

28. A method according to claim 27, further including the step of associating each of said memory bandwidth control registers with a resource seeking main memory access.

29. A method according to claim 21, further including the step of storing data relating to a requesting resource indicative of at least one of memory usage and memory bandwidth for that resource.

30. A method according to claim 21, wherein the step of granting requests includes the step of fulfilling requests for main memory access in the order requested.

31. In an information system including a main processor, a main memory, and at least a first and a second resource competing with said main processor for access to said main memory, a method of controlling access to said main memory comprising the steps of:
storing requests for main memory access from a first resource in a first resource request queue;
storing requests for main memory access from a second resource in a second resource request queue;
delaying forwarding requests for main memory access to a memory access control circuit to reduce the frequency of switching between memory read states and memory write states;
granting requests for main memory access by said memory access control circuit; and
storing data for a requesting resource indicative of wasted memory cycles due to granting main memory access to that resource.

32. In an information system including a main processor, a main memory, and at least a first and a second resource competing with said main processor for access to said main memory, a method of controlling access to said main memory comprising the steps of:
storing requests for writing to main memory from a first resource in a first resource write request queue;
writing to main memory by said first resource;
generating a write queue flush signal by said first resource to initiate copying information in said first resource write request queue to main memory;
flushing said first resource write request queue; and
generating a flush acknowledge handshake signal to competing resources that data written to main memory is actually stored in main memory rather than in said first resource write queue.

33. A method according to claim 32, further including the steps of
storing requests for writing to main memory from a second resource in a second resource write request queue;
delaying forwarding requests for memory access to a memory access control circuit to reduce the frequency of switching between main memory read states and main memory write states; and
granting requests for main memory access by said memory access control circuit.

34. A method according to claim 33, wherein said step of delaying includes the step of storing requests in a multiple resource write queue.

35. A method according to claim 32, further including the step of storing requests for main memory access by said main processor in a main processor request queue.

36. A method according to claim 32, further including the steps of arbitrating requests for main memory access among competing resources and controlling the frequency with which requesting resources are enabled to participate in main memory access arbitration.

37. A method according to claim 36, wherein the step of controlling the frequency includes the step of accessing the contents of a memory access control register associated with a resource for determining the frequency that said resource is permitted to participate in main memory access arbitration.

38. A method according to claim 32, further including the step of controlling main memory access by programming at least one of a set of control registers in said memory controller by said main processor.

39. A method according to claim 32, further including the steps of arbitrating main memory access requests between said resources by accessing a plurality of memory bandwidth control registers and determining which resource will be granted main memory access in part based upon the contents of said memory bandwidth control registers.

40. A method according to claim 39, further including the step of associating each of said memory bandwidth control registers with a resource seeking main memory access.

41. A method according to claim 32, further including the step of storing data relating to a requesting resource indicative of at least one of memory usage and memory bandwidth for that resource.

42. A method according to claim 32, further including the step of fulfilling requests for main memory access in the order requested.

43. In an information system including a main processor, a main memory, and at least a first and a second resource competing with said main processor for access to said main memory, a method of controlling access to said main memory comprising the steps of:
storing requests for writing to main memory from a first resource in a first resource write request queue;
writing to main memory by said first resource;
generating a write queue flush signal by said first resource to initiate copying information in said first resource write request queue to main memory;
flushing said first resource write request queue;
storing requests for reading from main memory from a second resource in a second resource read request queue;
comparing the main memory address associated with the read request with the addresses stored in at least one write queue; and
flushing said at least one write queue if there is a match between the main memory address associated with the read request and any of the addresses stored in said at least one write queue.

44. In an information system including a main processor, a main memory, and at least a first and a second resource competing with said main processor for access to said main memory, a method of controlling access to said main memory comprising the steps of:
storing requests for writing to main memory from a first resource in a first resource write request queue;
writing to main memory by said first resource;
generating a write queue flush signal by said first resource to initiate copying information in said first resource write request queue to main memory;
flushing said first resource write request queue; and
storing data for a requesting resource indicative of wasted memory cycles due to granting main memory access to that resource.

45. In a graphics system including a main processor and a graphics processing system for generating graphics images on a display in cooperation with said main processor, and a main memory, said system including a plurality of resources requesting access to said main memory, a memory controller comprising:
a plurality of buffer memories, two or more of said buffer memories being operatively coupled to a different respective one of said plurality of resources requesting access to said main memory and storing information indicative of a request for main memory access from that one of said plurality of resources;

a multiple resource buffer memory coupled to said plurality of buffer memories; and a control circuit for controlling the transfer of requests from said plurality of buffer memories to said multiple resource buffer memory, wherein said control circuit is operable to control the transfer of the requests from said plurality of buffer memories to said multiple resource buffer memory to reduce the frequency of switching from main memory write operations to main memory read operations, wherein said plurality of buffer memories and said multiple resource buffer memory are write request queues, wherein a resource that is writing to main memory generates a flush signal for initiating flushing of that resource's write request queue, and wherein a flush acknowledge handshake signal indicates to competing resources that data written to main memory is actually stored in main memory rather than in an associated resource's buffer.

* * * * *